United States Patent
Krug et al.

(10) Patent No.: US 7,961,988 B2
(45) Date of Patent: Jun. 14, 2011

(54) RAPIDLY TUNABLE WAVELENGTH SELECTIVE RING RESONATOR

(75) Inventors: William P. Krug, Bellevue, WA (US); Jocelyn Y. Takayesu, Tacoma, WA (US); Michael Hochberg, Pasadena, CA (US); Thomas W. Baehr-Jones, Pasadena, CA (US); Eric Y. Chan, Mercer Island, WA (US); Larry Dalton, Silverdale, WA (US); Axel Scherer, Laguna Beach, CA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 11/849,981

(22) Filed: Sep. 4, 2007

(65) Prior Publication Data

US 2009/0067773 A1    Mar. 12, 2009

Related U.S. Application Data

(60) Provisional application No. 60/843,882, filed on Sep. 11, 2006.

(51) Int. Cl.
  *G02B 6/26* (2006.01)
  *G02F 1/065* (2006.01)

(52) U.S. Cl. ............... 385/1; 385/2; 385/40; 385/50

(58) Field of Classification Search ............ None
See application file for complete search history.

(56) References Cited

U.S. PATENT DOCUMENTS

| | | | |
|---|---|---|---|
| 5,926,496 A | 7/1999 | Ho et al. | |
| 6,195,187 B1 | 2/2001 | Soref et al. | |
| 2002/0090163 A1* | 7/2002 | Lim et al. | 385/15 |
| 2004/0114930 A1 | 6/2004 | Krug et al. | |
| 2005/0054199 A1* | 3/2005 | Block et al. | 438/689 |
| 2006/0233504 A1* | 10/2006 | Hochberg et al. | 385/129 |
| 2006/0291791 A1* | 12/2006 | Hochberg et al. | 385/132 |
| 2007/0152198 A1* | 7/2007 | Jen et al. | 252/582 |

FOREIGN PATENT DOCUMENTS

| WO | WO 00/49752 | 8/2000 |
|---|---|---|
| WO | WO 01/22141 A1 | 3/2001 |
| WO | WO 02/11489 A2 | 2/2002 |
| WO | WO 03/007440 | 1/2003 |

OTHER PUBLICATIONS

K. Oda et al. A wide-FSR waveguide double-ring resonator for optical FDM transmission systems. Journal of Lightwave Technology, 9:6:728, Jun. 1991.*

(Continued)

*Primary Examiner* — Mike Stahl

(57) ABSTRACT

A system and method are disclosed for a rapidly tunable wavelength selective ring resonator. An embodiment of a voltage-tunable wavelength selective ring resonator includes a ring-shaped waveguide formed on a semiconductor substrate, an electro-optic cladding layer formed over the ring-shaped waveguide, and voltage applying means for applying a voltage across the electro-optic cladding layer. The ring-shaped waveguide is configured to propagate optical signals having predetermined resonant wavelengths, the electro-optic cladding layer has a voltage-controlled variable refractive index, and the means for applying is configured to apply a wavelength-specific control voltage to the electro-optic cladding layer. The wavelength-specific control voltage will shift or tune the predetermined resonant wavelengths for the ring-shaped waveguide.

13 Claims, 12 Drawing Sheets

OTHER PUBLICATIONS

R. Kubacki. Monolithic integration of microphotonics with CMOS microelectronics using molecularly engineered materials and nanostructures. Proceedings of the 56th Electronic Components and Technology Conference (2006), 776-781, May-Jun. 2006.*

Michael Hochberg et al., Towards A Millivolt Optical Modulator With Nano-Slot Waveguides, Optics Express, vol. 15, No. 13, Jun. 25, 2007, pp. 8401-8410.

Tom Baehr-Jones et al., Optical Modulation and Detection in Slotted Silicon Waveguides, Optics Express, vol. 13, No. 14, Jul. 11, 2005, pp. 5216-5226.

Tom Baehr-Jones et al., Optical Resonators in Silicon-On-Insulator-Based Slot Waveguides, Applied Physics Letters 86, 2005.

Gates et al., Hybrid Integrated Silicon Optical Bench Planar Lightguide Circuits, 1998 Electronic Components and Technology Conference, May 25, 1998, pp. 551-559, New York, NY.

Boussey, et al., Optoelectronic Integration in Silicon-On-Insulator Technologies, Semiconductor Conference 1998, Oct. 6, 1998, pp. 407-415, New York, NY.

Baack, Entwicklungstendenzen Photonischer Nachrichtennetze, Trends of Photonic Communications Network, Sep. 1, 1996, pp. 192-197, vol. 50, No. 9/10, Berlin, DE.

Kosaka, et al., Superprism Phenomena In Photonic Crystals, American Institute of Physics, Oct. 15, 1998, pp. R10096-R10099, vol. 58, No. 16, Japan.

MICROMAGAZINE.COM, Holy Grail! Motorola Claims High-yield GaAs Breakthrough, Oct. 1, 2001, pp. 1-3.

* cited by examiner

TABLE 1. PREDICTED AND MEASURED ELECTRO-OPTIC ACTIVITY FOR VARIOUS DEVICES AT 1550 nm

| MATERIAL | INDEX | ELECTRODE SPACING (μm) | POLING FIELD (V/μm) | EXPECTED $r_{33}$ (pm/V) | $r_{33}$ (pm/V) | TUNING (GHz/V) | Q VALUE |
|---|---|---|---|---|---|---|---|
| YL156/PMMA | 1.56 | 4.2 | 71 | 36 | 13 ± 2 | 0.10 | 1890 |
| YL124/APC | 1.61 | 4.5 | 67 | 67 | 22 ± 1 | 0.17 | 3000 |
| YL124/PAS41 | 1.73 | 5.5 | 55 | 157 | 40 ± 2 | 0.34 | 1750 |

TABLE 2. TUNABLE WDM MICRO-RING RESONATOR ROADM AND MODULATOR SUMMARY AT 1550 nm

| | WAVELENGTH ADD/DROP TUNING TIME (usec) | EO TUNING OF CHANNEL TUNING (GHz/V) | $r_{33}$ (pm/V) | FLAT TOP OR CLEAR CHANNEL BW PASSBAND (GHz) | TUNING (GHz) | #Ch@50 GHz Ch SPACING |
|---|---|---|---|---|---|---|
| 1 x 4 x 1 RAPIDLY TUNABLE HYBRID EO POLYMER-Si ROADM | <0.3 | 0.34 | 92 | 1st ORDER FILTER | 180 | 0.34 |
| | MODULATION SPEED (MHz) | FWHM SHIFT (V) | $r_{33}$ (pm/V) | Q | | |
| 1 x 4 x 1 RAPIDLY TUNABLE HYBRID EO POLYMER-Si MODULATOR | >3* | 324 | 92 | 1750 | | |

*TIME FRAME FOR BURST OPTICAL SWITCHING REGIME

FIG. 21

RAPIDLY TUNABLE WAVELENGTH SELECTIVE RING RESONATOR

CROSS-REFERENCE TO RELATED APPLICATION

This application claims the benefit of U.S. Provisional Application Ser. No. 60/843,882, filed Sep. 11, 2006, the content of which is incorporated herein by reference.

STATEMENT REGARDING FEDERALLY SPONSORED RESEARCH OR DEVELOPMENT

This invention was made with government support under contract number N00421-02-D-3223 D.O. 0001 awarded by DARPA and contracted by the United States Navy. The government has certain rights in this invention.

PARTIES TO A JOINT RESEARCH AGREEMENT

The Boeing Company, California Institute of Technology and University of Washington are parties to a Joint Research Agreement.

TECHNICAL FIELD

Embodiments of the subject matter described here relate generally to optical communication devices, systems, and methodologies. More particularly, the embodiments relate to optical ring resonators.

BACKGROUND

In fiber optic communications, dense wavelength division multiplexing (DWDM) is a technique for multiplexing multiple optical carrier signals onto a single optical fiber. This form of frequency division multiplexing is commonly referred to as DWDM when applied to optical systems that employ a high level of multiplexing. The potential of optical fiber is more fully exploited when multiple beams of light at different frequencies (wavelengths) are transmitted on the same fiber. By using different wavelengths of laser light to carry different signals, capacity is multiplied. In a DWDM system, a multiplexer is used at the transmitter to join the signals together and a de-multiplexer is used at the receiver to split the signals apart.

An optical ring resonator is a device that is capable of both multiplexing and de-multiplexing, and it can function as an add-drop multiplexer on a fiber-optic communication bus. Optical ring resonators include a waveguide in a closed loop, coupled to one or more input/output (or bus) waveguides. When light of the appropriate wavelength is coupled from an input waveguide to the ring, constructive interference causes a buildup in intensity over multiple round-trips through the ring. The light is ultimately coupled to an output waveguide. Since only selected wavelengths resonate in the ring, the ring functions as a filter. A range of applications such as optical switching, electro-optical switching, wavelength conversion, and filtering have been demonstrated using optical ring resonators.

Conventional multiplexer switches integrated with wavelength selective devices, such as micro-electromechanical mirrors (MEMS), liquid crystal mirrors or lenses, and thermo-optic switches are typically limited to switching speeds in the millisecond range; even the fastest response ferroelectric liquid crystals and smallest thermo-optic switching speeds are limited to several microseconds. Although these components are suitable for configurable DWDM circuit networks, they are not suitable to replace electrical cross-connect switches used for network applications requiring very rapid (e.g., less than one microsecond) switching speeds, such as applications for tactical aircraft avionics. These relatively slow switches are also unsuitable for use in DWDM optical burst or optical packet switch based networks.

Existing technologies for wavelength selective devices: (1) switch too slowly; (2) only switch over a very limited wavelength range, namely a single full width at half maximum (FWHM); (3) are not readily compatible with silicon processing; (4) because of their large size due to low refractive index contrast and incompatibility with silicon processing, do not readily scale in the manner of a VLSI implementation; (5) are limited to configurable DWDM circuits; (6) do not readily extend over a 20 nanometer free spectral range required for colorless wavelength switching across the C-band; and (7) do not operate at practical voltages since electro-optic coefficients are insufficient and electrode gaps are too large.

BRIEF SUMMARY

A rapidly tunable wavelength selective ring resonator device is disclosed herein. The ring resonator device uses a silicon-on-insulator ridge or slotted silicon waveguide coated with an unoriented organic electro-optic cladding. Poling or increasing the orientation of dielectric moment of the organic electro-optic coatings under an electric field at temperatures above the polymer softening point or glass transition temperature (Tg) converts it to an electro-optically active film. Applying voltages to the electro-optically active film below Tg changes the material's refractive index which allows rapid voltage tuning of wavelength resonances, yielding rapid wavelength tuning and selectivity. Filling a doped, very small electrode gap, slotted silicon waveguide with a poled and oriented electro-optic material increases the wavelength tuning per volt by increasing the applied E-field by the ratio of applied voltage to the electrode slot width or electrode gap size. For ridge waveguides, electrode gaps are microns in size. For slotted waveguides, electrode slot widths can be tens of nanometers.

A first embodiment of a voltage-tunable wavelength selective ring resonator includes: a ring-shaped waveguide formed on a semiconductor substrate, the ring-shaped waveguide being configured to propagate optical signals having predetermined resonant wavelengths; an organic electro-optic cladding layer formed over the ring-shaped waveguide, the organic electro-optic cladding layer having a voltage-controlled variable refractive index; and voltage applying means for applying a voltage across the organic electro-optic cladding layer, the means for applying being configured to apply a wavelength-specific control voltage to the organic electro-optic cladding layer, the wavelength-specific control voltage corresponding to the predetermined resonant wavelengths for the ring-shaped waveguide.

A second embodiment employs a ring resonator wavelength selector system. The system includes: an optical ring resonator waveguide configured to propagate optical signals having desired resonant wavelengths according to a refractive index of an electro-optic cladding layer on the optical ring resonator waveguide surface, the electro-optic cladding layer formed over the optical ring resonator waveguide, the electro-optic cladding layer having a voltage-controlled variable refractive index, wherein the voltage-controlled variable refractive index influences the desired resonant wavelengths propagated by the optical ring resonator waveguide; and a plurality of electrodes coupled to the organic electro-optic cladding layer and configured to provide a control voltage to the organic electro-optic cladding layer.

A further embodiment uses a method for operating a wavelength selective ring resonator. The ring resonator includes a silicon waveguide on a silicon-on-insulator substrate, and an organic electro-optic cladding layer formed over the silicon waveguide. The method involves: determining a wavelength band of wavelengths for the wavelength selective ring resonator from a plurality of input signal wavelengths; and biasing the organic electro-optic cladding layer with a control voltage to tune the organic electro-optic cladding layer to select signals having wavelengths within the wavelength band of wavelengths.

In certain embodiments, the cladding layer is formed from an organic electro-optic solution containing electro-optic chromophores, molecules with a conjugated backbone and large dipole moment, dispersed or covalently bonded into host materials such as polymers or dendritic organic molecules, dissolved in a common solvent (e.g. cyclopentanone). This material exhibits non-linear changes in optical properties when exposed to an electrical field. The optic polymers employed here are transparent to most telecommunication wavelengths.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present subject matter may be derived by referring to the detailed description and claims when considered in conjunction with the following figures, wherein like reference numbers refer to similar elements throughout the figures.

FIG. 21 is a table that summarizes aspects of a tunable WDM Micro-Ring Resonator ROADM and Modulator at 1550 nm;

DETAILED DESCRIPTION

Figure 1:
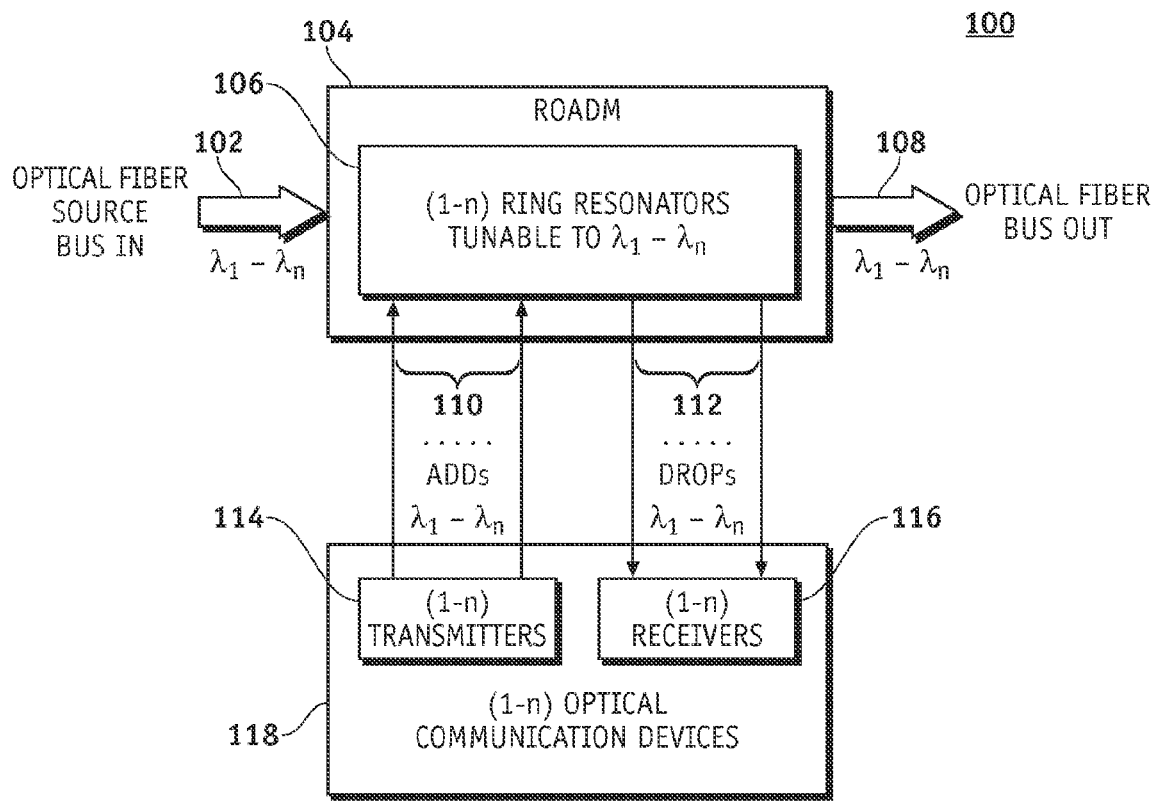
FIG. 1 is a schematic representation of a typical system that implements optical ring resonators.

Electro-optic building blocks on silicon-on-insulator can enable wafer scale optical interconnects to meet emerging high-speed communications and data processing needs. Organic electro-optic materials for key photonic building blocks have recently shown tenfold greater electro-optic activity than their inorganic counterparts. This trend of increasing electro-optic activity continues through the theory-inspired design and nano-engineering of organic electro-optic materials.

Rapid electro-optic switches such as Mach-Zehnder interferometers and resonant cavity microring resonator filters have many commercial and military applications as building blocks for radiofrequency photonics and wavelength selective switches and modulators for DWDM optical signals. Their voltage tunable wavelength selective filter characteristics are useful for modulator for optical DWDM signals and rapidly tunable ROADMs for configurable DWDM interconnects as well as electro-optic modulators and detectors. ROADMs using MEMs and thermo-optic polymer devices have millisecond response times that limit their use to configurable optical circuits. The very fast (tens of femtoseconds) intrinsic response of organic electro-optic materials make them very attractive for high bandwidth operation. These materials have demonstrated optical modulation speeds up to 100 GHz in commercial devices and up to 1.6 THz experimentally.

Also, the THz intrinsic bandwidth can be traded off for lower drive voltages by use of resonant device structures such as ring resonators, etalons, and photonic bandgap periodic structures. ROADMs using electro-optic materials tune rapidly enough to consider for optical burst and packet switching schemes. Modulators made using inorganic electro-optic materials such as silicon, gallium arsenide, and lithium niobate have recently demonstrated up to 50 GHz modulation speeds. However, due to their intrinsically limited electro-optic activities, slow response times, and high velocity mismatch between electrical and optical waves, these devices have severe performance limitations.

The high electro-optic activity of these organic materials also allows for the fabrication of electro-optic modulators with low halfwave voltages of less than 0.8 V and even lower halfwave voltages have recently been achieved by Lumera Corporation. In addition, the π-electrons of organic materials define both index of refraction and dielectric permittivity behavior leading to good velocity matching between optical and radiofrequency waves making these materials attractive as an ideal medium for electro-optic switches and optical interconnects.

In this study, we have demonstrated some of the advantages of integrating silicon technology with highly active organic electro-optic materials. A hybrid electro-optic ring resonator was designed and the material, fabrication, and operation conditions were optimized to produce an electro-optic active device. From there a multi-device, electro-optic active, rapidly reconfigurable optical add/drop multiplexer (ROADM) with individually tunable microring resonators of good resonance quality and wide channel spacing was designed and built. Mechanical, temporal, and photo-stability of these devices was also studied. In addition to producing very high and controllable electro-optic activities in these devices, we found reasonable correlation between our results and published electro-optic values among a variety of electro-optic materials.

A summary of the operating principles for voltage tuned wavelength selection follows. The change of the effective index for single ring or slotted ring waveguide resonators of circumference or length (l) is $$\Delta n_e = \frac{0.5 K n^3 r_{33} V}{d} V/d,$$

where
$\Delta n_e$=change of the effective index;
K=product of effective index susceptibility and effective E-field;
n=refractive index of mode;
$r_{33}$=electro-optic coefficient of cladding or core material;
V=voltage applied across optical waveguide core; and
d=electrode gap.

The relative shift in the effective index relative to the effective index of the optical mode in the optical waveguide is $\Delta n_e/n_e = \Delta v_{FWHM}$(3 dB BW)/v. The typical device tuning voltage parameters are fundamentally limited by the breakdown strength of the material and practically limited by CMOS or suitable drive electronics that will support sub-nanosecond switching times, assuming device response times are minimized by small RC time constants and high Q optical ring geometries that will rapidly turn off. For tunable ring resonator filters, one desires a maximum: (1) wavelength tuning sensitivity (GHz/V) for ring resonator filters where changes in refractive index for electric fields applied to oriented electro-optic materials with maximum $r_{33}$ (pm/V) and minimum electrode gaps; (2) a maximum wavelength tuning range in nm that is limited only by the maximum applied fields and effective index change for the oriented EO polymer cladding with maximum EO material response $r_{33}$ (pm/V).

Device Design and Predictions
Waveguide Geometry

To produce high quality silicon waveguides we use commercially available silicon on insulator wafers with 1.4 µm thick buried oxide layer and 120 nm silicon top layer. The high refractive index contrast between the silicon and oxide layers allows us to fabricate compact waveguides that are 0.5 µm wide while maintaining loss optical losses better than 7 dB/cm. With these dimensions, only one optical mode polarized in the horizontal direction is supported in the 1.4-1.6 µm spectral range. Compared to air, polymer cladding has not shown to significantly change optical loss. Loss may even be slightly decreased due to the mode being pulled into cladding.

Figure 10:
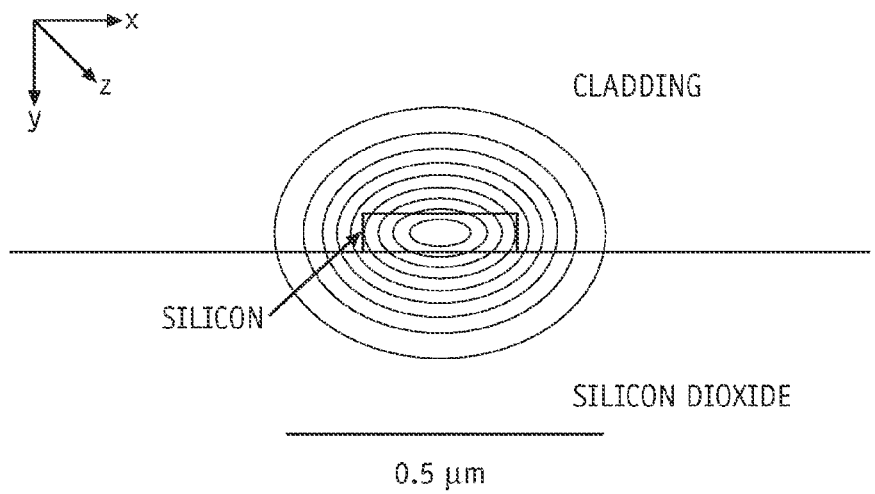
FIG. 10 illustrates a modal profile of a silicon waveguide.
Figure 11:
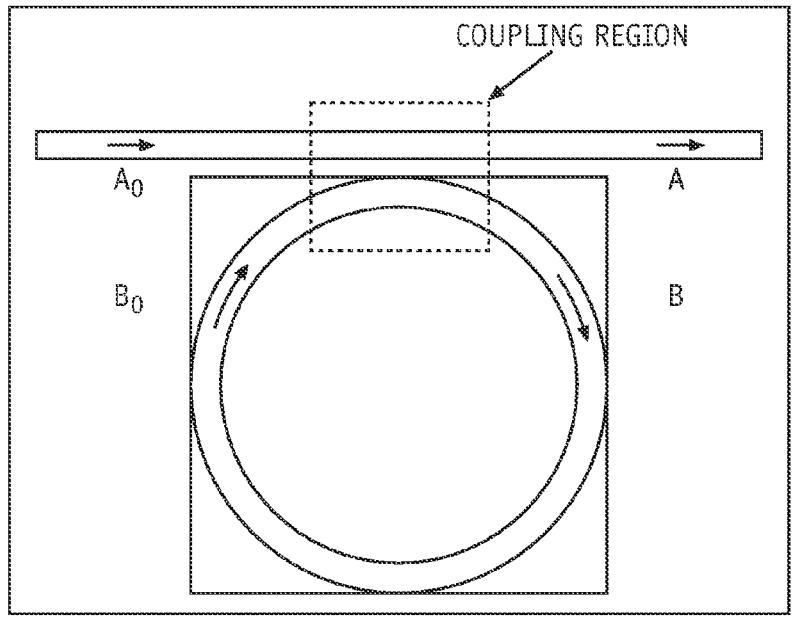
FIG. 11 illustrates the coupling path of light from a channel waveguide into and out of a ring.

Illustrated in FIG. 10 is the modal profile of the silicon waveguide determined using a finite difference-based Hermitian eigensolver. We purposely designed the waveguide to have more than 30% of the mode outside of the core so that perturbing the dielectric constant of the upper cladding would induce a significant change in the effective index of the mode.

We can predict the effect of a small regional dielectric change of the upper polymer cladding on the effective index using the equation $$\frac{\partial n_{\mathit{eff}}}{\partial \varepsilon} = \frac{\int\int |E|^2\, dxdy|}{2\sqrt{\frac{\mu_0}{\varepsilon_0}}\int\int R_e(E^*\times H)\cdot e_z dxdy} \quad \text{(Equation 1)}$$

where $\in$ is the electric permittivity, µ is permeability, and E is the applied electric field. Assuming that the mode travels in the z-direction, the numerator is integrated over the upper cladding region and the denominator is integrated over the entire x-y plane.

Ring Resonator Design and Theory

The microring resonator is a resonant cavity device that traps light with wavelengths, $\lambda_m$ that divide evenly into the effective path length, L, of the resonator times the effective index of the mode, $n_{\mathit{eff}}(\lambda_m)$ as shown in equation 2, where m is an integer indicating the order of resonance $$\lambda_m = \frac{L}{m} n_{\mathit{eff}}(\lambda) \quad \text{(Equation 2)}$$

To theoretically predict wavelength shift as a function of cladding index change, we combine equations 1 and 2 in following equation $$\lambda = \frac{L}{m}\left[1-\left[\frac{L}{m}\right]\left[\frac{\partial_{\mathit{eff}}}{\partial \lambda}\right]\right]^{-1} \times \left[\frac{\partial_{\mathit{eff}}}{\partial \varepsilon_c}\right]\Delta\varepsilon_c + \frac{L}{m} n_{\mathit{eff}}(\lambda_0) \quad \text{(Equation 3)}$$

In previous studies performed by our group using index matching fluids, we found a reasonable correlation between theory predicted values and experimental results.

Resonance wavelengths that satisfy equation 2 can be coupled into and out of ring resonators placed in close proximity to a second waveguide. Coupling efficiency can be lithographically controlled by varying the distance between the waveguide and ring. In these rings a distance of 200 nm was found to be best coupling distance to optimize Q.

We can measure the Q-factor, which is a measure of stored energy in the ring and loss per cycle, by analyzing the optical spectrum of a device using the ratio of wavelength over $\lambda_{FWHM}$, the full bandwidth at half maximum of transmitted power $$Q = \frac{\lambda_0}{\lambda_{FWHM}} \quad \text{(Equation 7)}$$

The free spectral range (FSR) or spacing between resonance peaks can be determined using the equation $$FSR = \lambda_{m+1} - \lambda_m \approx \frac{\lambda^2}{(n_{\it eff}(\lambda)L)} \quad \text{(Equation 8)}$$

which can also be used to experimentally measure the effective index.

Lastly finesse, f, a factor used to determine channel capacity is the ratio of FSR to $\lambda_{FWHM}$ and is inversely proportional to loss and ring radius.

$$f = \frac{FSR}{\lambda_{FWHM}} \quad \text{(Equation 9)}$$

Silicon, which has an extremely high index of refraction and low optical loss, has allowed for the fabrication of ring resonators with diameters less than 10 μm, FSRs greater than 15 nm, and Q values of over 100,000. In these experiments, however, we intentionally quenched Q to values below 5,000 to allow for greater coupling efficiency and reproducibility.

Diffraction grating coupling was the chosen method for coupling of a single TE mode into and out of the device waveguide. Although diffraction grating coupling introduced an average of −10 dB insertion loss, this coupling method enabled simpler and more reproducible fabrication as well as a reduction of the footprint of the device to less than 250 μm², allowing for dense device packing.

Electrode Design and Theory

The electrodes used to align and modulate the electro-optic active material surrounding the ring resonator waveguide were designed to induce a large electric field parallel to the TE mode. Electrode widths of 5 μm were fabricated due to limited alignment and mask resolution capabilities. Electrode heights of 120 nm were chosen to exclusively modulate cladding within 500 nm of the core, which is an estimated boundary of evanescent wave penetration. To avoid loss due to plasmon coupling of the optical signal to the metal electrodes, the outer electrode was split into two electrodes and connected with long runouts and the inner electrode was accessed using a plated via. Modulation across the coupling regions was avoided in order to simplify the electrode design.

ROADM Design and Theory

Figure 12:
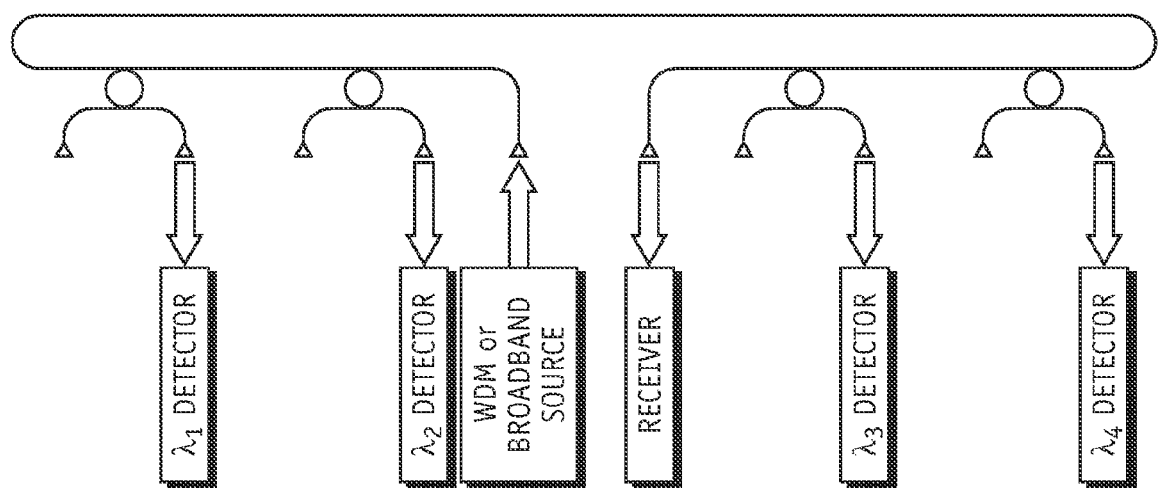
FIG. 12 is a schematic of a 1×4×1 ROADM with individually tunable cascaded hybrid electro-optic microring devices coupled to a common bus waveguide.

Of great interest to the data and telecommunications industries is to apply these devices as filters to rapidly and simultaneously add and drop various wavelength channels to and from a single multi-wavelength source coupled to an optical bus in a simple approach to a ROADM device. We demonstrate this concept using a simple cascaded microring device of four microring resonators coupled to a common (bus) waveguide (FIG. 12). Broadband light is inserted into the bus and resonant wavelengths specific to each ring resonator is individually demultiplexed into separate waveguides. Resonance properties can be precisely tuned to select specific wavelengths by varying the radius of each ring or by tuning the cladding index. By reversing the input and output roles, the ROADM in our experiments can also act as a multiplexer to combine various optical signals into a single waveguide.

In ROADM applications, the key figure of merit is to improve the tuning shift (GHz/V) rather than minimize VFWHM especially for higher pole filters with higher spectral efficiencies. Also of major interest is the speed at which the resonances, or channels, can be tuned.

Electro-Optic Materials

When an alternating or constant polarity (i.e., AC or DC) electric field is applied to electro-optic materials, a change in index of refraction occurs which alters the speed of an optical signal traveling through it. The applied electrical field produces this response by disturbing the electronic polarization of non-centrosymmetrically ordered chromophores dispersed in organic matrix material (e.g. polymer or dendrimer). Changes to the applied electric field cause a change in the local refractive index; this is called the Pockels Effect. The relationship of index change, Δn, to applied field can be expressed as:

$$\Delta n = n_0 - n(E) = \frac{1}{2} r_{33} n_0^3 E \quad \text{(Equation 10)}$$

where $n_o$ is the index of refraction with no applied field, n(E) is the index of refraction as a function of applied field, $r_{33}$ is the electro-optic, or Pockels', coefficient, and E is the applied field in V/m. From both simple measurements and the theoretical plot of Δn versus Δλ determined using analytical methods, we can extract a linear relationship between the shift in wavelength to the change in cladding.

$$\Delta\lambda = 40.69 \times \Delta n_{clad} \times 2 n_{clad} \quad \text{(Equation 11)}$$

From here we can easily calculate the electro-optic activity factor, $r_{33}$, by measuring the shift in wavelength position with applied voltage and using equations 10 and 11.

Figure 13:
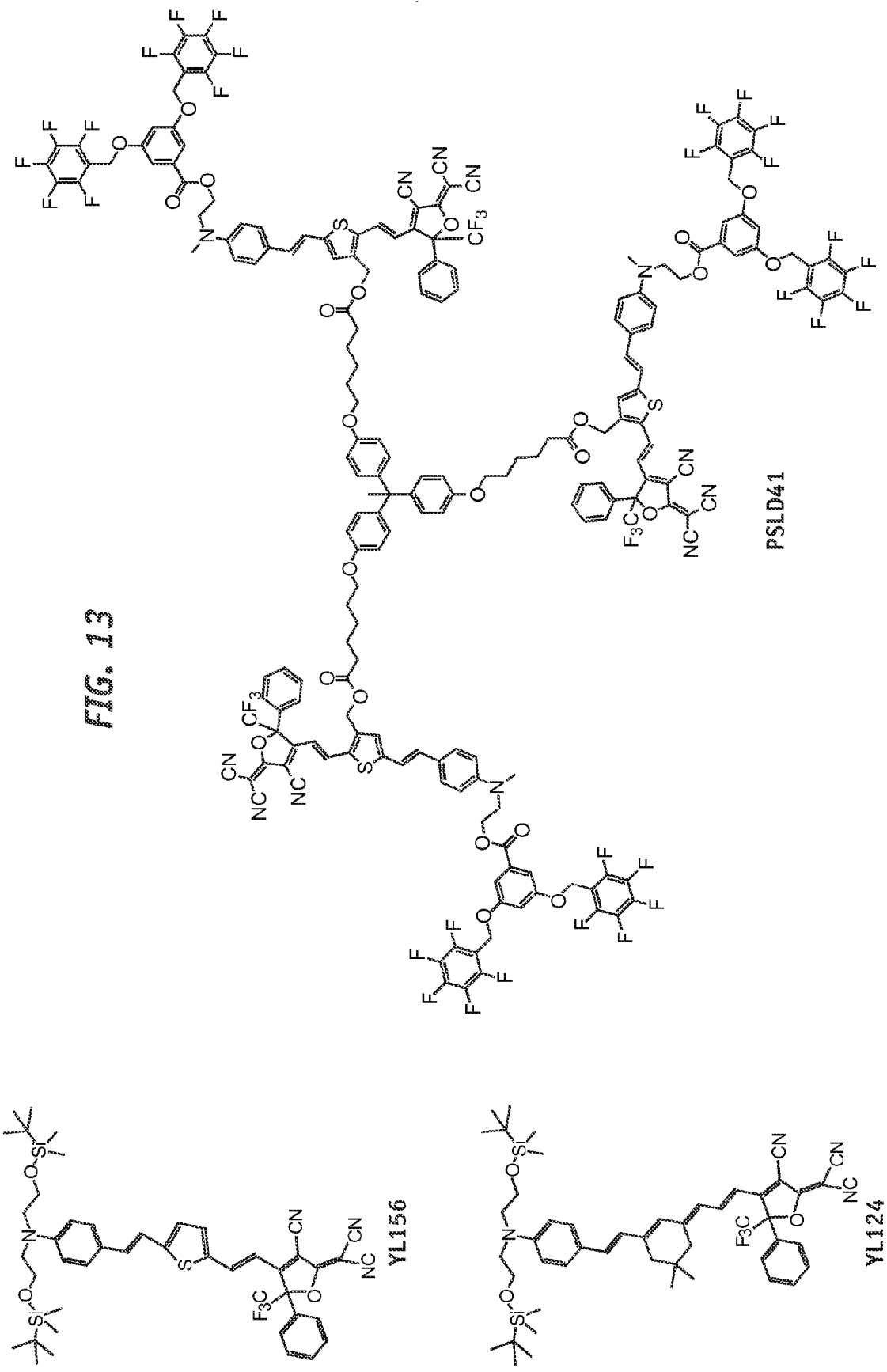
FIG. 13 illustrates chemical structures of electro-optic chromophores.
Figure 14:
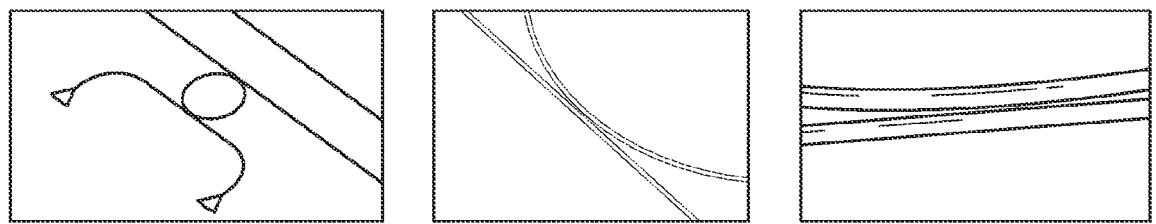
FIG. 14 illustrates an embodiment of a ring resonator.

Three electro-optic active cladding systems were examined in this study. The first was a FTC-type chromophore, YL156, doped 25% in polymethylmethacrylate (FIG. 13) which has been shown to have excellent photostability. The second was a variant of the widely used CLD chromophore, YL124, doped 25% into an APC-based copolymer which has demonstrated good photostability and thermal stability over 85° C. The third system was YL124 doped 25% into a dendritic chromophore host, PSLD41 which has enhanced electro-optic activity. These materials have been measured using the Teng-Mann technique at 1.3 μm to have $r_{33}$ values of 50, 120, and 285 pm/V, respectively. All three films have demonstrated good photostability at telecommunication wavelengths and thermal stability over 70° C.

Structure, Operation, and Fabrication of Hybrid Silicon-Organic Devices

Silicon ring resonator devices having 80 μm diameter and 400 nm waveguide width were fabricated from electronic grade silicon-on-insulator wafers with top silicon thickness of approximately 120 nm on 1.4 μm bottom oxide using a Leica EBPG 5000+ electron beam system at 100 kV. Prior to lithography, the samples were manually cleaved, cleaned in acetone and isopropanol, baked for 20 minutes at 180° C., coated with 2 percent HSQ resist from Dow Corning Corporation, spun for two minutes at 1000 rpm, and baked for an additional 20 minutes. The samples were exposed at 5 nm step size, at 3500 μC/cm2.

The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then dipped in buffered hydrofluoric acid in order to remove the remnants of electron beam resist from the surface. The 1×4×1 ROADM consisted of four parallel cascaded ring resonator filters horizontally coupled to a common waveguide with 120 nm spacing (FIG. 12).

Figure 15:
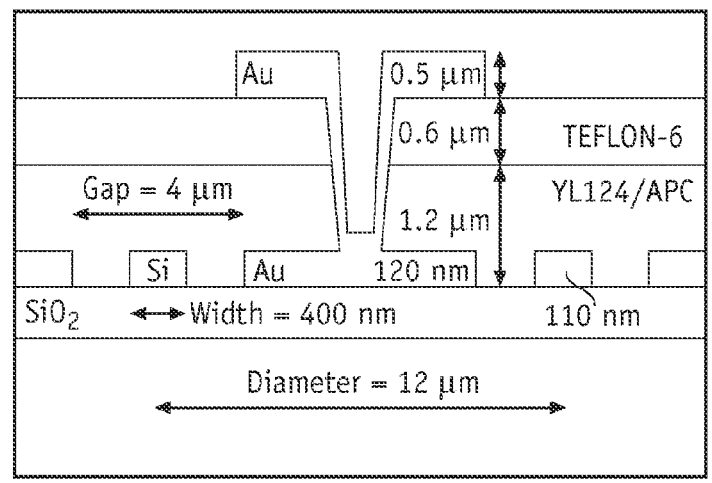
FIG. 15 illustrates the cross-section schematic of a single hybrid microring resonator device.

The cross section of the hybrid ring resonator is shown in FIG. 15. Electrodes were patterned by depositing 10 nm of chromium and 100 nm of gold using e-beam evaporation followed by standard photolithography and wet etching of the metal electrode pattern. electro-optic material was prepared as a 25 weight % mixture of YLD124 in (Poly[Bisphenol A carbonate-co-4,4'-(3,3,5-trimethylcyclohexylidene) diphenol carbonate]) dissolved with cyclopentanone to form a 12 solids weight % solution. After complete dissolution overnight, the solution was filtered through a 0.2 μm PTFE filter. Solutions of 25% YLD156 in PMMA and 25% YL124 in PSLD41 were prepared in an identical manner. One micron thick films of these materials were spun-cast onto the silicon-on-insulator devices substrates, baked for 1 minute at 110° C. and vacuum cured overnight at 85° C. To protect the electro-optic layer from following fabrication steps, a 0.5 μm TEFLON® AF 601S2-1-6 film was spun-cast and cured. A 100 nm thick gold hard mask was sputtered on top of this film and vias were patterned using photolithography. The vias were etched through reactive ion etching using an $O_2$/He gas mixture. To contact through the via to the middle electrode, 500 nm of gold was sputtered and the top electrodes were patterned by photolithography. A second 0.5 micron TEFLON® layer was applied to the top of the device for protect the upper electrodes from delaminating and contact pads were cleaned using $O_2$/He plasma etching.

The device in FIG. 15 is poled and tuned by application of a voltage laterally across the organic electro-optic cladding between the inner and outer diameter of the Si microring resonator. The maximum applied horizontal E field is simply estimated by the applied voltage divided by the electrode gap. The actual applied E fields at any given location, both horizontal and vertical, are lower, and can be estimated by simulation, assuming no flow of current.

However, since leakage currents are present during poling and device operation, estimates of position dependent E-fields are more complex, and may contribute to less than estimated tuning efficiencies measured for device operation. To minimize electro-optic effects across the optical coupling region, the electrodes and applied E field did not span this region. The process for contact poling involved raising the temperature of the sample to just below its glass transition temperature (Tg≈146° C. for YL124/APC), applying a DC voltage to the inner and outer electrodes, and holding the sample at that temperature under a potential field for two minutes after which the sample was cooled back down to room temperature and the field was removed.

Device Parameters and Performance
Single Organic-Silicon Hybrid Devices

Figure 16:
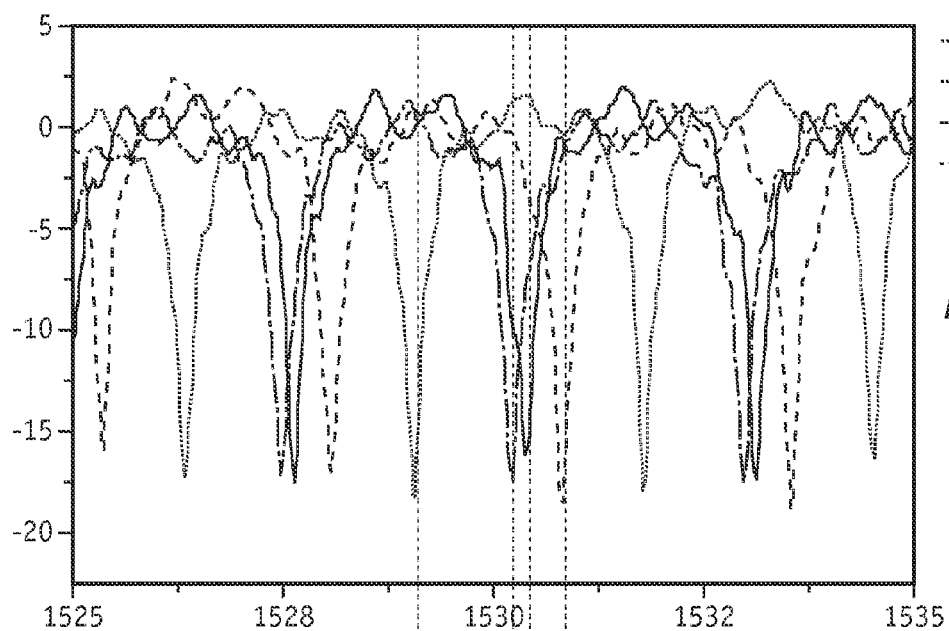
FIG. 16 illustrates the overlayed resonance spectra viewed from single device output.
Figure 17:
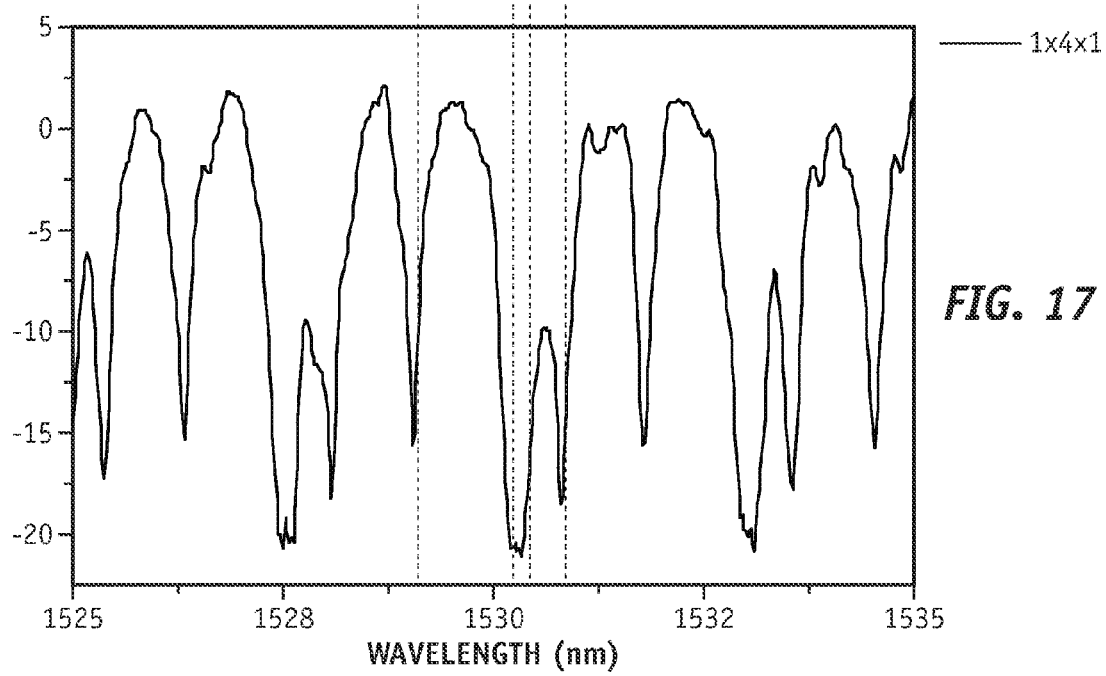
FIGS. 17 and 18 illustrate the resonance spectrum of a 1×4×1 ROADM device.
Figure 18:
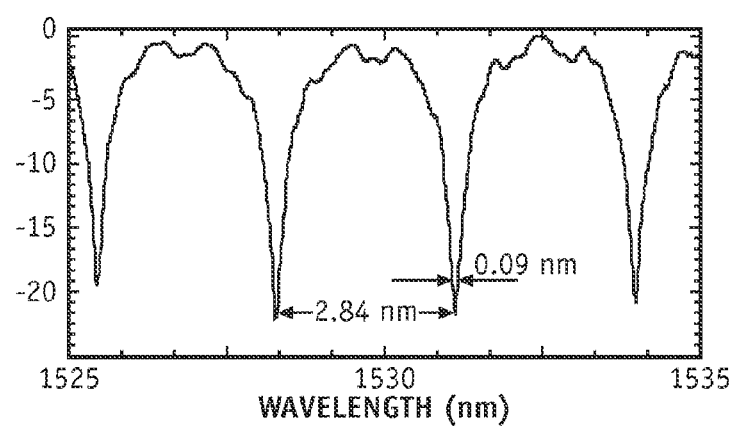

Samples were mounted onto an optical stage system and coupled out-of-plane to a single-mode optical fiber array using grating couplers. The light source was a Lightwave Technologies broadband amplified spontaneous emission (ASE) source centered at 1550 nm with 20 mW optical power. The output signal was analyzed using an ANDO AQ6316 Optical Spectrum Analyzer with 0.05 nm resolution. In FIG. 16, the spectral scans of each of the four microring resonator devices is overlayed and can be compared to the spectral scan of the 1×4×1 ROADM in FIG. 17.

The direct correlation of the resonance peaks of each filter with resonance peaks of the ROADM shows that the spectrum of the ROADM is indeed a linear combination of its constituent device spectra. The total optical loss for a diffraction grating coupled electro-optic clad silicon microring resonator and the coupled 1×4×1 system is around −10 dB and −20 dB, respectively. As shown in the FSR for these electro-optic clad devices is 2.74 nm and the 3-dB bandwidth for these devices is approximately 0.51 nm. A resonant wavelength of Device 1 (see the plot labeled DEV 1 in FIG. 16) at 1,529.06 nm shows a 17.5 dB drop in transmission.

These details imply Q values for these devices around 3,000 and finesse values above 5. Prior to poling, the resonance spectra of the sister rings of this ROADM were identical as expected given their identical diameters and cladding. After poling all four resonator devices simultaneously however, it was observed that the resonance spectra no longer matched in resonances differing by as much as 1 nm or $\Delta n_{eff}$=0.004. One possible explanation is that due to small differences in electrode alignment and spacing the material surrounding each resonator was poled with varying field strengths resulting in subtle differences in index big enough to give each device a distinct resonance spectrum.

To determine the magnitude of electro-optic tuning (GHz/V) DC voltage was applied to the device using a TREK 810B power supply/amplifier. By coupling to the input and output ports of device 5, the DC modulation of device 4 was monitored showing a clear shift to the left when −300 V was applied, a return to the original position when voltage was removed, and a clear shift to the right when 300V was applied. This 0.63 nm shift with 600V DC modulation at 1.55 μm is equivalent to 0.167 GHz/V tuning. The $r_{33}$ value of the electro-optic material was then determined to be 22 pm/V using equations 10 and 11.

Although this value is lower than the expected $r_{33}$ value of 67 pm/V for YL124/APC measured at 1.55 μm with 67 V/μm poling field, it shows higher electro-optic activity that those obtained from polymer microring resonators or Mach-Zehnder modulators made from CLD1/APC. Devices 1, 2 and 4 (see plots labeled DEV 1, DEV 2, and DEV 4 in FIG. 16) yielded similar electro-optic activities ranging from 0.131 to 0.160 Ghz/V. When kept under vacuum over three months, this electro-optic ROADM maintained over 80% of its original activity indicating good thermal and mechanical stability.

Figures 19, 20:
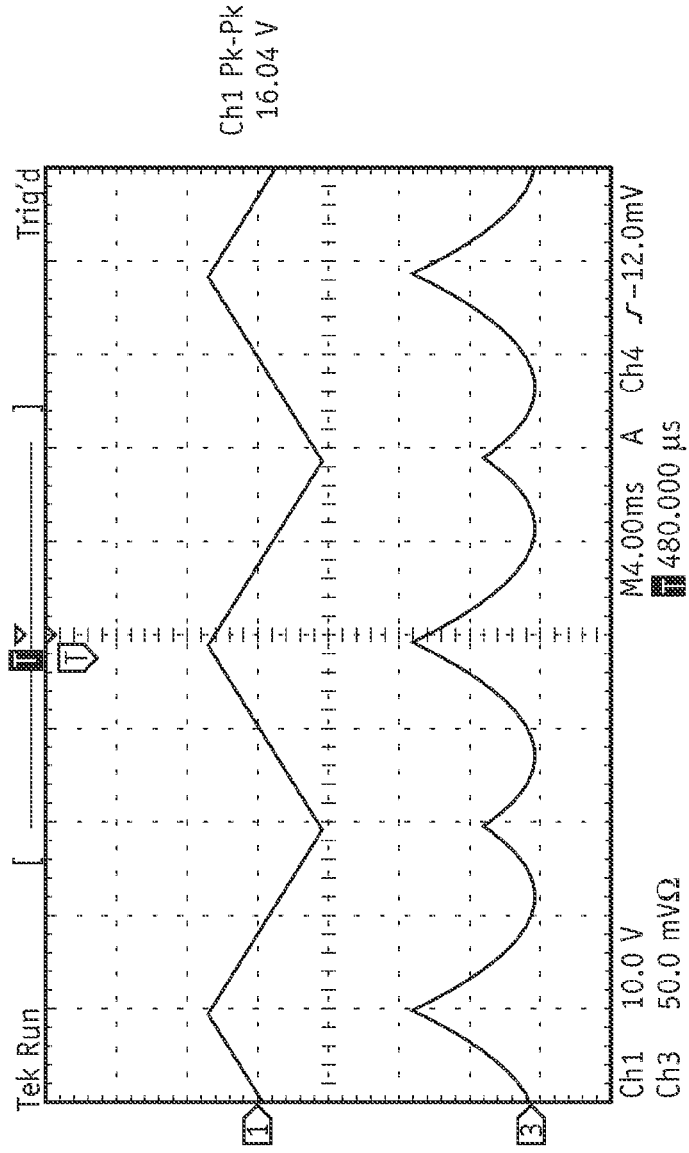
FIG. 19 is a table of predicted and measured electro-optic activity for various devices at 1550 nm.
FIG. 20 illustrates modulation of optical intensity with applied triangular AC voltage.
Figures 22, 23:
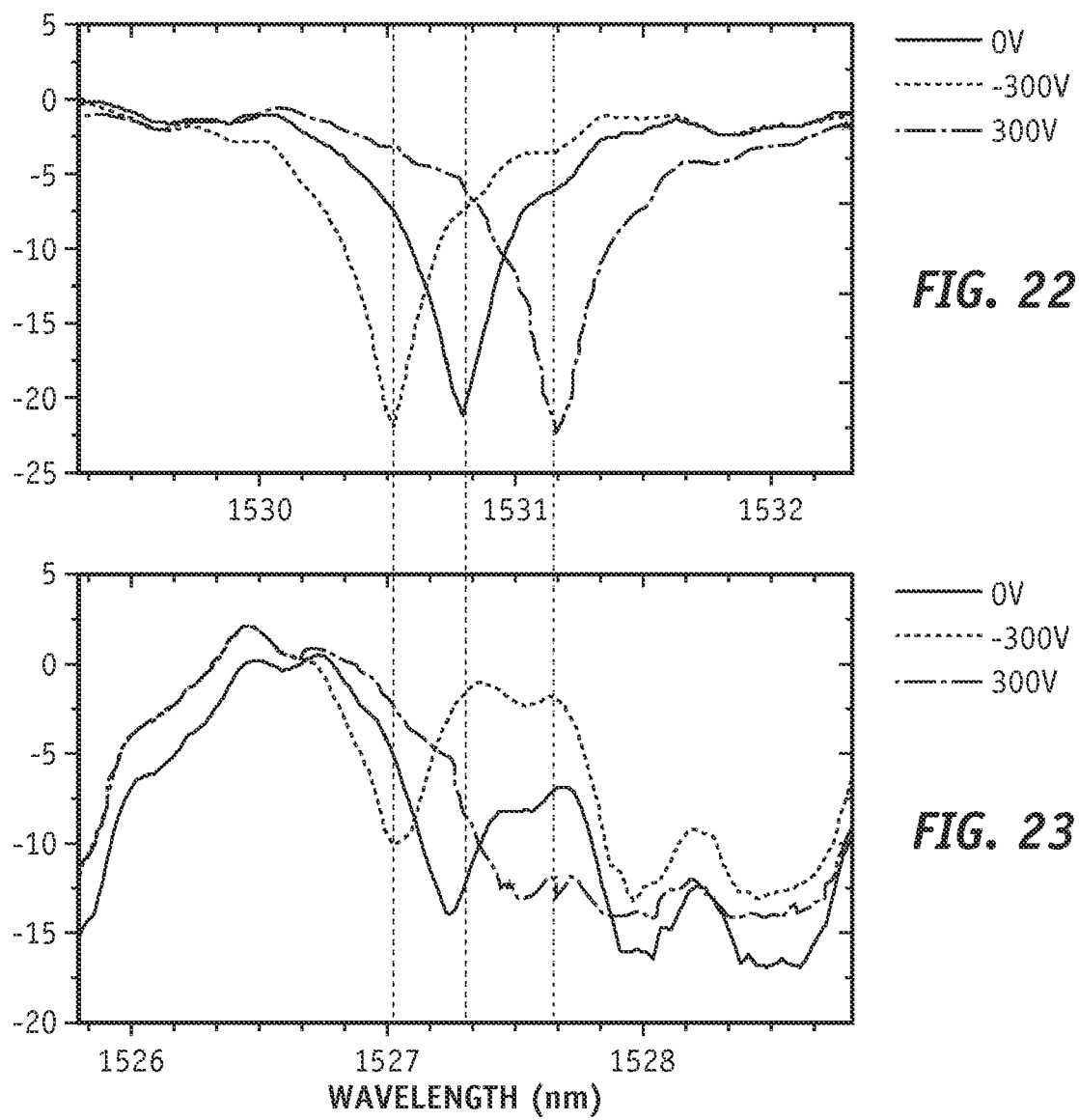
FIG. 22 illustrates a resonance modulation viewed from single device output.
FIG. 23 illustrates a resonance modulation of single device viewed from 1×4×1 device output.

Electro-optic ROADMs fabricated using the system of YL124 chromophore doped into the dendritic chromophore PSLD41 showed more than a twofold increase in electro-optic activity of 0.34 GHz/V and $r_{33}$ values of up to 41 pm/V (FIG. 19). At high modulation voltages (±300V DC), these devices exhibited up to 1.44 nm or 180 GHz tuning. The measured r33 values from these experiments studying three different organic electro-optic systems showed good correlation to the expected $r_{33}$ values determined using the Teng-Mann technique. The lower than expected electro-optic performance of the materials may be due to our choosing not to pole over the coupling regions of this device, which limits our modulation field by at least 30%.

AC modulation experiments were performed using an HP tunable laser source and a Laser Diode Inc detector/TIA module connected to a post amplifier for optical to electrical signal conversion. A Tektronix TDS 3034 Scope was used to display the signal waveform. An HP 3312A function generator was connected to the TREK 810B power supply/amplifier in amplifier mode to create the triangular waveform signal. Modulation of optical intensity with applied AC signal in these devices could be easily detected below 8 V with 3 MHz modulation frequency (FIG. 20). It is important to note here that the instrumentation available at the time of testing did not allow for device operation speeds greater than 3 MHz.

1×4×1 ROADM

To demonstrate the functionality of the 1×4×1 ROADM, the ring resonator filters should be capable of being modulated independently of each other. By coupling to the bus device while modulating only device 4, we can see that only one peak modulates significantly while the other peaks maintain the same position. Although the resonance of device 4 overlaps with another device spectrum, we can see a definite match in shifting behavior between and general match in peak position. In our studies, all four ring resonator filters could be modulated independently which demonstrates the complete functionality of our 1×4×1 ROADM device.

Our measured tuning shows that these devices would support tuning of at least four 50 GHz channels.

Conclusion

The voltage needed to tune these devices could potentially be decreased by more than threefold by reducing the electrode gap from 5 μm to 1.5 μm using better photomask resolution or e-beam patterning. To further improve ROADM tuning characteristics, coupling two equal diameter rings in series would allow us to use the Vernier effect to increase FSR, multiplying the tuning shifts by a relationship to the ring diameter ratios.

Drive voltage can be cut in half by applying the push-pull poling technique used in Mach-Zehnder interferometers to these devices by poling the rings in opposite directions. Using higher quality-factor devices with Q values above 100 k would dramatically lower the VFWHM by five-fold for modulator applications.

Tuning Value Projections for Hybrid Wafer Scale Electro-Optic on Silicon-on-Insulator Devices The best silicon-on-insulator microring devices for modulators have shown to have a $\Delta\lambda_{FWHM}$ of less than 0.016 nm. This wavelength shift would imply an index change in cladding of 0.00025. If we use a material with 300 pm/V electro-optic activity and 2 μm electrode spacing, a $\lambda_{FWHM}$ or −15 dB shift would require 0.63V. A device with these parameters would display 3.2 GHz/V tuning and have a drive voltage× length value of 0.016 VFWHM cm, a very small value compared to other electro-optic modulator devices due to its small footprint. With this tuning parameter, only a several-fold enhancement would be required to tune over a 50 GHz DWDM channel spacing. This enhancement can readily be achieved with Vernier tuning approaches of unequal diameter ring resonators and/or reduced electrode gaps. The use of smaller diameter silicon-on-insulator rings to extend the FSR to (40 channels*50 GHz/channel) and multi-pole silicon-on-insulator microring filters to optimize the spectral efficiency will lead to rapidly electro-optic tunable, DWDM compatible hybrid electro-optic on silicon-on-insulator device systems.

In summary, we were successful in demonstrating the first hybrid silicon-organic electro-optic ROADM device, strong electro-optic tuning, and good thermal and photo-stability. It was also shown that there is still much room for improvement with regards to electric field optimization, stronger electro-optic materials, and improved device quality. These results have thus demonstrated that hybrid silicon-organic polymer devices are highly likely to satisfy the needs of tomorrow's demanding telecommunications industry by meeting its high standards, contributing unique and beneficial characteristics, and through seamless integration with existent silicon-based technologies.

The following detailed description is merely illustrative in nature and is not intended to limit the embodiments of the present subject matter nor the application and uses of such embodiments. Furthermore, there is no intention to be bound by any expressed or implied theory presented in the preceding technical field, background, brief summary or the following detailed description.

Embodiments of the present subject matter may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, optical communication, ring resonators, waveguides, semiconductor device fabrication processes, and other functional aspects of the systems (and the individual operating components of the systems) may not be described in detail herein. In addition, those skilled in the art will appreciate that embodiments of the present subject matter may be practiced in conjunction with a variety of optical communication systems and optical communication system configurations, and that the system described herein is merely one particular embodiment of the present subject matter.

Figure 8:
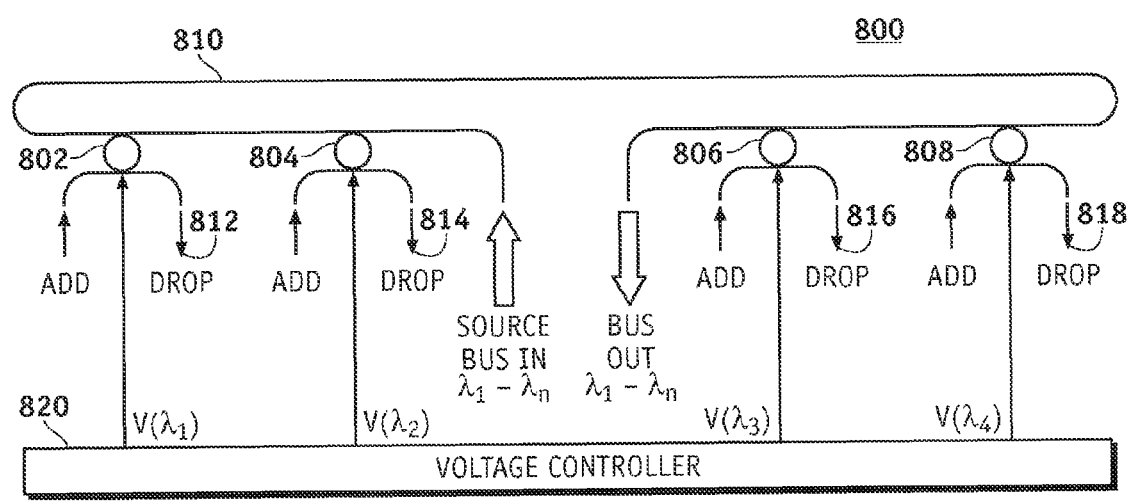
FIG. 8 illustrates a schematic top view of an embodiment of a scalable, very rapidly reconfigurable optical add-drop multiplexer.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1, 2, and 8 depict exemplary arrangements of elements, additional intervening elements, devices, features, or components may be present in an embodiment of the present subject matter.

FIG. 1 illustrates a typical system 100 that implements an optical ring resonator. Additional details of an existing ring resonator design and an application for its use can be found in United States Patent Application Number 2004/0114930 A1, the content of which is hereby incorporated by reference in its entirety. System 100 includes, without limitation: an optical fiber source bus input 102, a reconfigurable optical add-drop multiplexer (ROADM) 104, tunable optical ring resonators 106, an optical fiber source bus output 108, add waveguides 110, drop waveguides 112 (in practice, order of adds and drops may reversed), and optical communication devices 118. The optical fiber source bus input 102 (and the optical fiber source bus output 108) is a fiber optic line configured to transmit optical signals having a plurality of wavelengths $\lambda_1$-$\lambda_n$ to the ROADM 104.

Figure 2:
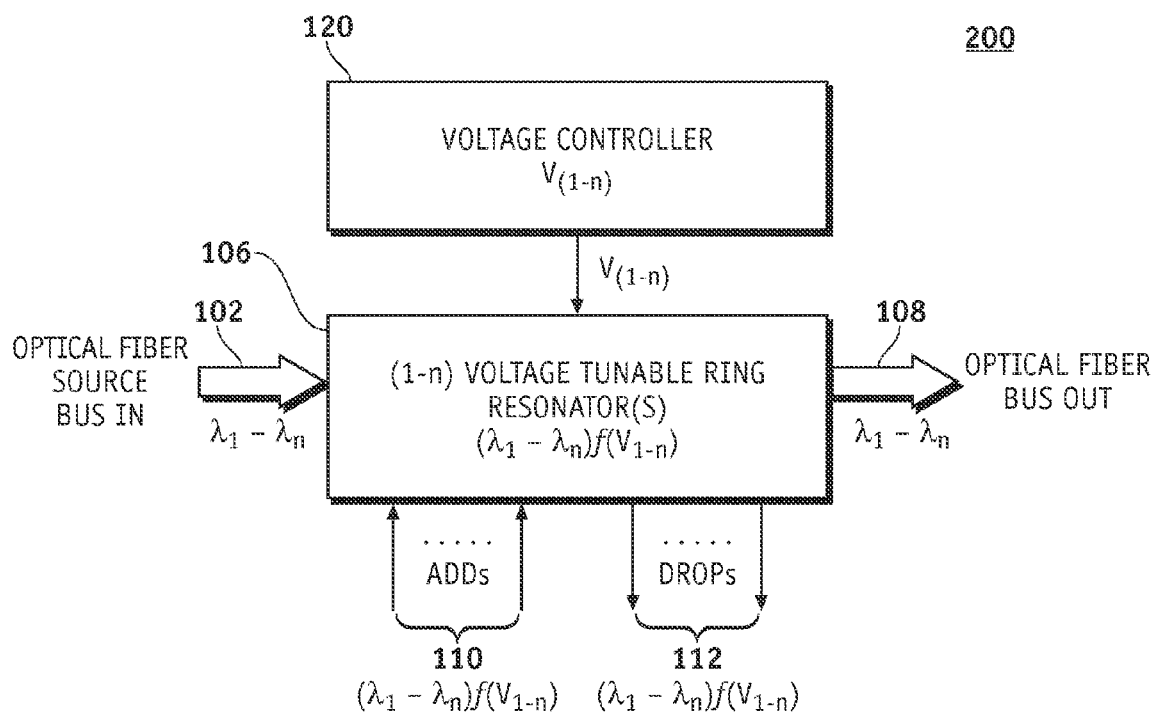
FIG. 2 is a schematic representation of one or more tunable optical ring resonators controlled by a voltage controller.

The ROADM 104 includes a number (n) of tunable optical ring resonators 106, each being configured to select one of the optical wavelengths $\lambda_1$-$\lambda_n$ based on a respective control/tuning voltage ($V_{(1-n)}$) as shown in FIG. 2. FIG. 2 illustrates the tunable optical ring resonators 106 controlled by a voltage controller 120. As described in more detail below, the tunable optical ring resonators 106 are voltage controlled such that the wavelengths are selected as a function of the control/tuning voltage.

The voltage controller 120 is coupled to and configured to control the tunable optical ring resonators 106 via electrical connections as described herein. The voltage controller 120 may include any number of distinct processing modules or components that are configured to perform the tasks, processes, and operations described in more detail herein. Although only one processing block is shown in FIG. 2, a practical implementation may utilize any number of distinct physical and/or logical processors, which may be dispersed throughout the operating environment. In practice, the voltage controller 120 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A controller may be realized as a microprocessor, a processing logic element, a microcontroller, or a state machine. A controller may also be implemented as a combination of computing devices, e.g., a combination of a digital signal processor and a microprocessor, a plurality of microprocessors, one or more microprocessors in conjunction with a digital signal processor core, or any other such configuration.

Referring again to FIG. 1, optical communication devices 118 are configured to add optical signals having certain wavelengths to the ROADM 104 via fiber optics add waveguides or service lines 110 and transmitters 114. Optical communication devices 118 are also configured to drop optical signals having certain wavelengths from the ROADM 104 via fiber optics drop waveguides or service lines 112 and receivers 116. "Add" and "drop" refer to the capability of the ROADM 104 to add one or more new wavelength channels to an existing multi-wavelength WDM signal, and/or to drop (remove) one or more wavelength channels, routing those signals to another network or device, such as the optical communication devices 118. The optical communication devices 118 may include, without limitation, radar systems, fiber optics cable services, local area networks, or wafer scale optical silicon waveguide interconnects between multiple processors and memory with reconfigurable interconnect densities too high to fit parallel interconnects without multiplexing signals to most efficiently use wafer real estate for long distance, ultra-high speed wafer scale interconnects.

Figure 3:
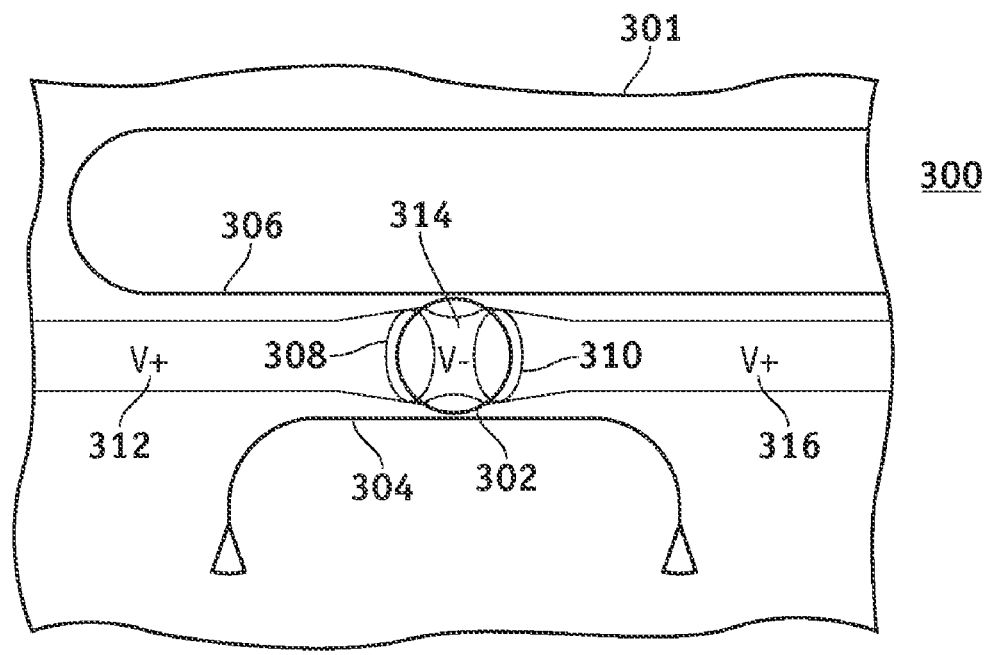
FIG. 3 is a top view of an embodiment of a single voltage tunable optical ring resonator.

FIG. 3 is a top view that illustrates an embodiment of a semiconductor-based optical ring resonator 300. FIG. 3 depicts some elements in a phantom manner because in reality such elements may be hidden from view. FIG. 3 shows a main ring element 302, input/output waveguides 304 and 306, electric field modulation areas 308 and 310, electrical connections 312/314/316, and an electro-optic cladding layer 301. The input/output waveguides 304 and 306 are functionally interchangeable. Either waveguide could function as a source waveguide 102 or an add/drop service lines 110/112 (see FIG. 1). There is no functional difference between the input/output waveguides 304 and 306.

Main ring element 302 is realized as a closed loop waveguide that is coupled to one or more input/output waveguides 304 and 306. When light of the appropriate wavelength is coupled to the main ring element 302, the light builds up in intensity over multiple round-trips due to constructive interference. Since only some wavelengths resonate in the main ring element 302, optical ring resonator 300 functions as a wavelength filter. In this manner, light having the appropriate wavelength is then output by another output waveguide 306. Main ring element 302 may be, without limitation, an optical ring resonator with a silicon-on-insulator silicon ridge waveguide, or a silicon-on-insulator slotted doped silicon waveguide. Main ring element 302 may be coated or clad with electro-optic cladding layer 301, which is explained below in the context of FIGS. 4-7.

An optical waveguide is a transmission line that transmits light via refractions of light off the boundary layer between the walls of the optical waveguide and cladding covering the walls of the optical waveguide. To become electro-optically active, organic electro-optic cladding layers must first be molecularly oriented by applying a DC E-field at temperatures around their softening point or glass transition temperature (Tg) and then cooled to ambient temperature with a DC E-field applied. Molecular self-assembly of electro-optic materials will also cause them to be electro-optically (electro-optic) active. A voltage applied to the oriented electro-optic material will cause an ultrafast femtosecond electronic change in the refractive index that is intrinsic to electro-optic materials. A change in the refractive index of the electro-optic material causes a change in the effective index of the silicon waveguide underneath. A change in the effective refractive index of the silicon waveguide ring resonator causes a change in optical path length for what is an optical Fabry Perot resonator wrapped into a ring resonator. The wavelength for the repeating resonances due to constructive interference in this resonator will be shifted as the path length is varied by the voltage applied to the electro-optic coating. Thus, in an optical ring resonator 300, the waveguides determine the wavelengths that resonate in the main ring element 302.

Figure 6:
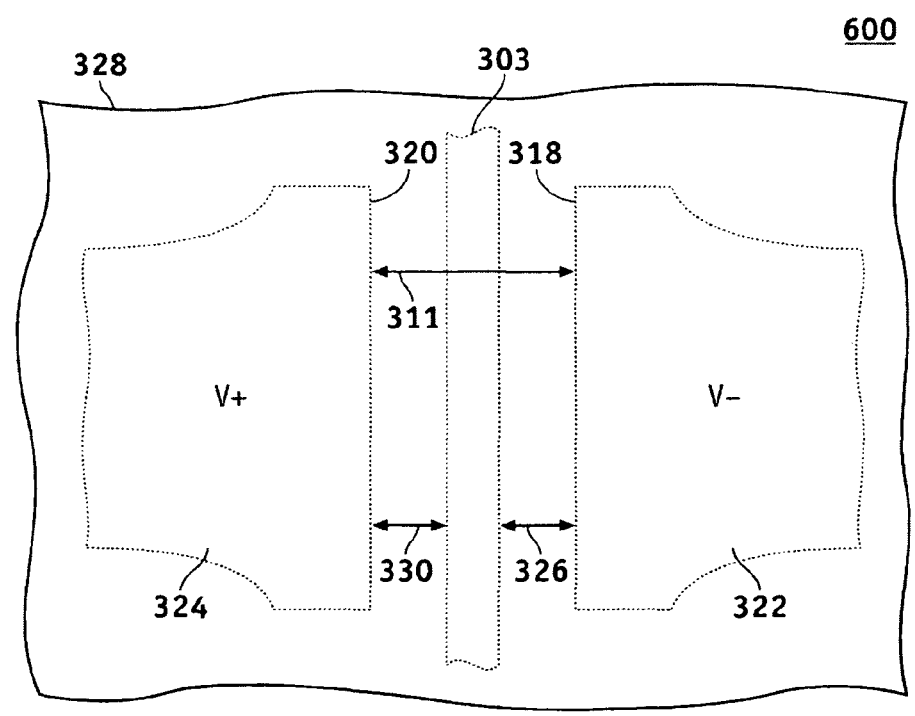
FIG. 6 is a top view of a detailed portion of an embodiment of a small segment of a silicon waveguide optical ring resonator with metal electrodes.
Figure 7:
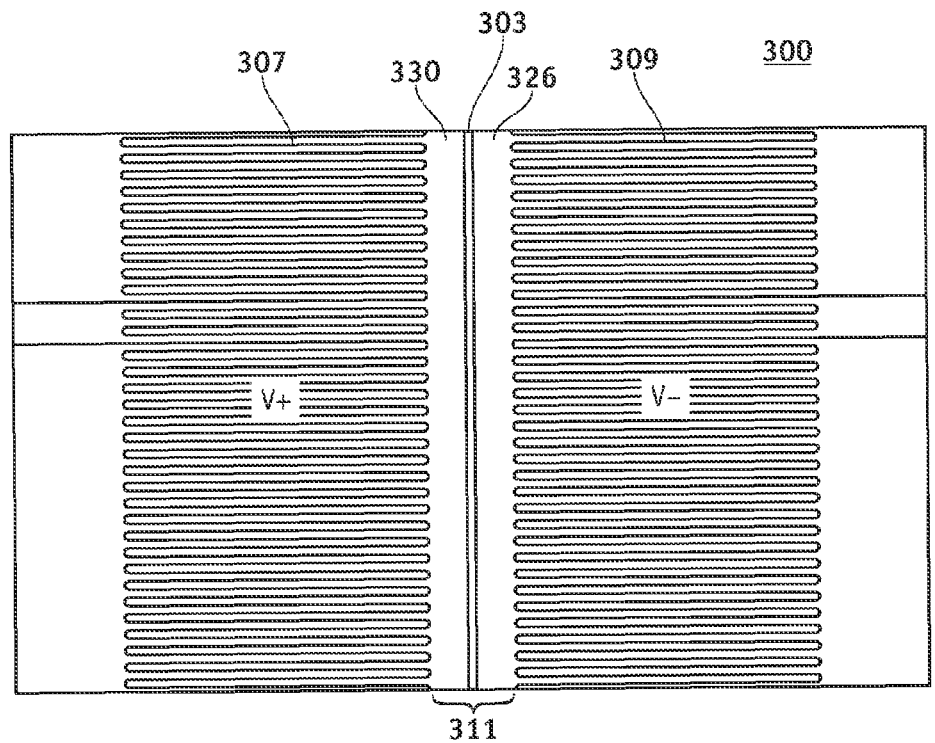
FIG. 7 is an expanded top view of an embodiment of doped silicon electrodes for use with a slotted optical ring resonator waveguide.

The waveguide 303 may be single ridge waveguide or a slot within parallel ridges. A ridge waveguide is a convex waveguide formed as an active silicon ridge structure on the semiconductor substrate. A slotted waveguide is a concave waveguide formed as a slotted air-gap structure between two high refraction index waveguides. A slotted ring waveguide comprises two concentric ring-shaped high-refraction index waveguides formed on the semiconductor substrate with an air-gap structure formed between the two concentric ring-shaped high-refraction index waveguides, where the air-gap structure propagates the desired optical signals. FIGS. 6 and 7 show short ridge and slotted silicon waveguides respectively that make up a short segment of a ring resonator. The optical path length or effective index over much of the circumference of the ridge or slots can be effectively changed to control the transmissible wavelengths by adding electro-optic cladding layer 301 on the ridges or slots, where electro-optic cladding layer 301 (as explained above) controls the effective refractive index the waveguide, and thus the wavelength of the electromagnetic waves that resonate in the ridge or the slot waveguide when formed in a ring in a ring resonator.

Figure 4:
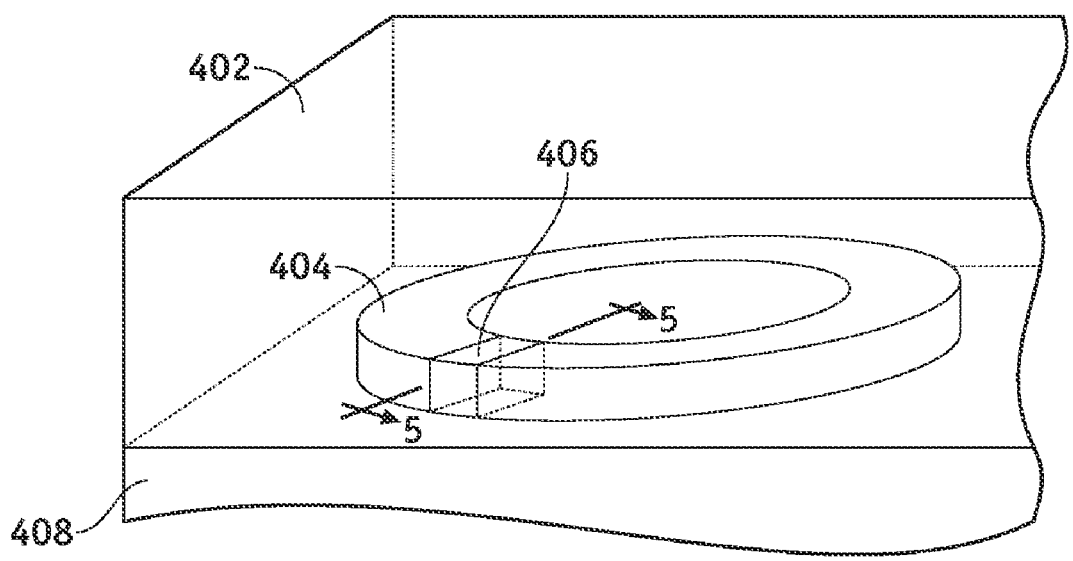
FIG. 4 is a perspective view that illustrates an embodiment of an silicon ridge optical ring resonator in a simplified manner.

FIG. 4 is a perspective view that illustrates an embodiment of a silicon ridge optical ring resonator waveguide 404, a portion of surrounding organic electro-optic cladding layer 402 (see organic electro-optic cladding layer 402 in FIG. 5), and a portion of the insulating oxide layer 408 in a simplified manner. FIG. 4 also shows a cutout portion 406 of the silicon ridge optical ring resonator waveguide 404 that is expanded in FIG. 5. The organic electro-optic cladding layer 402 overlays the silicon ridge optical ring waveguide 404 and its surrounding insulating oxide layer 408, and provides the refraction environment for the silicon ridge optical ring waveguide 404. Thus, changes in the refraction index of the organic electro-optic cladding layer 402 cause related changes in the internal optical path length experienced within the silicon ridge optical ring waveguide 404. Since only wavelength orders or wavelength multiples of the optical circumference will resonate in a ring resonator, the refraction index determines the wavelengths $\lambda_1$-$\lambda_n$ of the light that resonate in the silicon ridge optical ring waveguide 404 of an arbitrary circumference. Thus, the organic electro-optic cladding layer 402 varies the optical wavelengths and the resonant wavelengths for the optical ring resonator.

Figure 5:
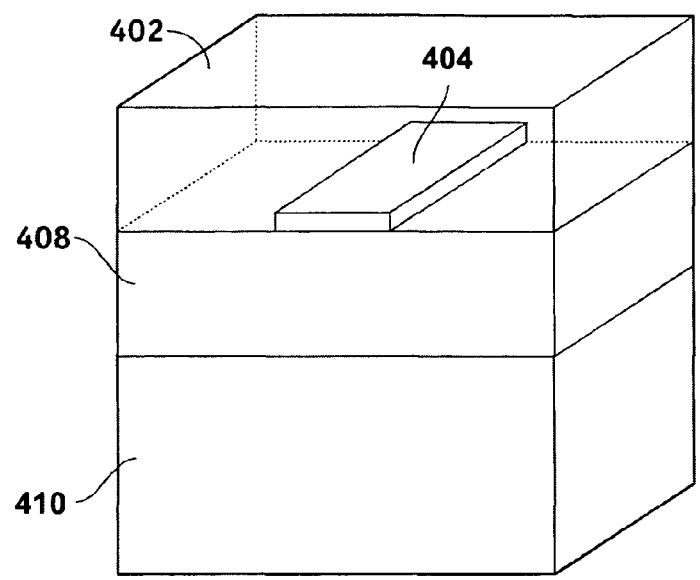
FIG. 5 is a perspective view that illustrates a cross section of the silicon ridge optical ring resonator as viewed from line 5-5 shown in FIG. 4.

FIG. 5 is a perspective view that illustrates a cross section of the silicon ridge optical ring resonator as viewed from line 5-5 shown in FIG. 4. FIG. 5 depicts the underlying silicon substrate layer 410 (bottom layer in FIG. 5), a doped insulating oxide layer 408 formed over substrate layer 410, an active silicon ridge waveguide 404 above the insulating oxide layer 408, and the organic electro-optic cladding layer 402 formed over active silicon ridge waveguide 404 and insulating oxide layer 408. The organic electro-optic cladding layer 402 coats the active silicon ridge waveguide 404, and may be coated across the entire surface of the optical ring resonator 300 as shown in FIG. 3. Examples of suitable cladding materials are provided below in connection with the description of organic electro-optic cladding 328. The optical ring resonators described herein are manufactured using semiconductor-based fabrication techniques and processes. The details of one suitable semiconductor fabrication process for the optical ring resonators can be found in U.S. patent application Ser. No. 11/849,985, the content of which is hereby incorporated by reference in its entirety.

Referring again to FIG. 3, input/output waveguides 304 and 306 are optically coupled to the main ring element 302, and function as input/output to the main ring element 302. As used here, "optically coupled" means transferring an optical signal from one waveguide to another ring waveguide to another waveguide or replicating an optical signal in one waveguide in another waveguide. Optical coupling may take many forms, for example, it may be optical leakage through a transparent waveguide wall, Raman scattering, stimulated emission, and the like. In practice, there may be more than two input/output waveguides, and each may function as an input or an output, or simultaneously both as an input and an output. Since one use of a ring resonator is to switch optical signals between two optical fibers, the optical signal input through a first waveguide may convey, for example, a set of cable television channels over DWDM being switched to an optical service drop, or alternatively, for another example, an internet signal from a home that is to be uplinked to an internet backbone network over DWDM. As another example, the optical DWDM signal might convey data from a sensor at one DWDM wavelength to an array of displays that are coupled to an optical bus that will select the specific wavelength of the sensor signal of interest. Although these examples are uses for these tunable devices, the most suitable use is to support burst or packet wavelength selective switching of DWDM data from sources to destinations where sub-microsecond wavelength selection times are required, such as avionics.

As will be explained in more detail below in the context of FIG. 3, electric field modulation areas 308 and 310 are formed with electrical connections 312/314/316, and are configured to electro-optically select the wavelengths of optical signals that may resonate in the optical ring resonator 300. Voltage controller 120 (see FIG. 1) is coupled to and configured to control electric field modulation areas 308 and 310 through electrical connections 312/314/316 as described herein. As will be explained in more detail below, electric field modulation areas 308 and 310 utilize the organic electro-optic cladding and control electrodes coupled to the electrical connections 316, 312, and 314. An electric field modulation area is used on each side of the ring waveguide in order to maximize wavelength tuning per volt between input/output waveguides 304 and 306 through the optical ring resonator 300. By having electric field modulation areas on each side of the ring, there is no path between input/output waveguides 304 and 306 that does not travel through an electric field modulation area. It is a way to maximize interaction length between the electro-optic material and the waveguide.

FIG. 6 is a top view of a detailed portion of an embodiment of an optical ring resonator. FIG. 6 depicts the electric field modulation area shown in FIG. 3, including: a waveguide 303, an organic electro-optic cladding 328, and control electrodes 324 and 322 coupled to electrical connections not shown in FIG. 6.

Waveguide 303 is a portion of the main ring element 302 of the optical ring resonator 300 as disclosed above. The waveguide 303 is suited for both analog and digital signals. In operation, waveguide 303 contains the optical signal resonating in the optical ring resonator 300.

The organic electro-optic cladding 328 enables the ring resonator to electro-optically select and limit the wavelength band of the optical signal in the waveguide 303, using the waveguide effective index tuning properties of electro-optic materials. (Note: here and throughout this disclosure a wavelength band may refer to a subset of a band of wavelengths or the full wavelength band, and thus need not be a strict or proper subset). The high index contrast between the silicon ring resonator and organic electro-optic cladding 328 coating minimizes bending loss allowing for the manufacture of smaller sized optical ring resonators. Organic electro-optic materials contain molecules that exhibit non-linear changes in optical properties when exposed to an electrical field. Thus, the molecules are randomly oriented in an unoriented polymer matrix, and have direction in an oriented film. Examples of optical polymers are polymethyl methacrylate (PMMA), and perfluorinated polymers such as polytetrafluoroethylene. For this embodiment, the electro-optic material solution comprises YL124 in a matrix of (Poly[Bisphenol A carbonate-co-4,4'-(3,3,5-trimethylcyclohexylidene) diphenol carbonate]), where the YL124 comprises about 25 percent of the electro-optic material. The electro-optic material solution comprises about 12 percent electro-optic material in cyclopentanone fluid. Devices using a second material of YL124 chromophore similarly dispersed in an electro-optic active dendrimer host, PSLD41 using trichloroethane were also fabricated. YL124 is synthesized in "Optical Modulation and Detection in Slotted Silicon Waveguides", Optics Express 11 Jul. 2005, Vol. 13, No. 14, the content of which is incorporated by reference here in its entirety. PSLD41 is synthesized in P. A. Sullivan, et al., "Tri-component Diels-Alder Polymerized Dendrimer Glass Exhibiting Large, Thermally Stable, Electro-optic Activity," Journal of Materials Chemistry, (2007), the content of which is incorporated by reference here in its entirety. Examples of electro-optic materials material can also be found in "Optical modulation and detection in slotted silicon waveguides", Optics express 11 Jul. 2005, Vol. 13, No. 14, the content of which is incorporated herein by reference. These electro-optic materials, when applied as claddings and poled, will change the effective refractive index of the underlying silicon waveguide ring resonator, based on the magnitude of the electric field applied across them. This will change the wavelength of the resonance that is coupled to the ring resonator. Orientation of the electro-optic coatings under a biasing voltage causes rapid tuning of the wavelength resonances. The wavelength resonance shift per volt for these devices is about 0.34 GHz/volt, with a maximum wavelength shift of greater than about 1.5 nanometers or 200 GHz observed. The organic electro-optic cladding is compatible with semiconductors allowing manufacturing using semiconductor processes.

Control electrodes 324 and 322 are coupled to a controller such as voltage controller 120 in FIG. 2. Control electrodes 324 and 322 are also covered by the organic electro-optic cladding 328, and are utilized to provide a desired voltage potential with almost no current flow across the organic electro-optic cladding 328 for controlling the properties of the organic electro-optic cladding 328.

The shape and material of the electrodes 324/322 affects the coupling to the organic electro-optic cladding 328, and thus the efficiency of the biasing voltage. Electrodes 324/322 may be made from metal or polysilicon depending on the desired manufacturing process. Since polysilicon has higher resistance that metal, with polysilicon electrodes maximum wavelength tuning is achieved at the expense of higher power consumption compared to the metal electrodes.

Control electrodes 324 and 322 are separated from each other by a distance 311 also known as an electrode gap. The waveguide device structures in FIG. 6 use metal electrodes. For this example, the distance 311 between electrodes 324 and 322 must be greater than 1.5 μm to minimize optical losses in the silicon waveguide. To minimize voltages required to apply electric fields to electro-optic materials, it is desirable to minimize the distance 311. FIG. 7 shows another approach to minimizing the distance 311. In this case, electrodes 307 and 309 are doped silicon electrodes having a serrated or accordion shape. The use of doped silicon electrodes and a periodic electrode structure allows shrinking the distance 311 between 330 and 326 to less than 50 nm, without significantly increasing optical loss. This allows a comparable electric field across the distance 311 between 330 and 326 in FIG. 7 to that between 322 and 324 in FIG. 6 at 30 times lower voltage, based on the ratio of the electrode gap, while only moderately increasing the optical waveguide loss and decreasing the Q for the optical ring resonator.

FIG. 7 is an expanded top view of an alternate embodiment of the electrodes 324/322 shown in FIG. 6. The serrated or accordion shaped electrodes 307/309 may provide significant increases to electric fields applied across the organic electro-optic cladding 328. In an electric field modulation area 308/310, there will be a relative positive electrode 307 and a relative negative electrode 309 to create a voltage potential across the organic electro-optic cladding layer between the electrodes. As shown as 328 in FIGS. 6 and 301 in FIG. 3, the organic electro-optic cladding layer covers the sides and top of the waveguide 303 (main ring element 302 in FIG. 3), and covers the electrodes 307/309. For doped silicon electrodes and ridge waveguides, the electrode gaps 330/326 may be made at least ten fold smaller (about 0.08 micrometer) than is possible using metal electrodes to apply electric fields to oriented organic electro-optic claddings across silicon ring. The reduced gap 330/326 makes possible a lower operating voltage than that obtained using metal electrodes. The doped silicon electrodes 307/309 were designed for use with a slotted waveguide.

Because the ring resonators of this disclosure are made of high index silicon and then clad with organic electro-optic materials instead of using ceramic or other traditional materials, the ring resonators can be made smaller due to the high index contrast. In addition, these electro-optic material clad silicon devices can be voltage tuned faster and consume much less power than junction doped silicon ring resonator designs that are current tuned due to refractive index changes resulting from changes in carrier concentrations or other charge carrier effects. For example, a high index contrast silicon ring resonator made with silicon coated with organic electro-optic materials may be less than 100 square microns while a low index contrast silica, ceramic or all polymer ring resonators may be 10000 square microns for the same free spectral range. A wavelength resonance shift per volt of several GHz/volt is possible with a sub microsecond rise and fall time. The sub microsecond rise and fall time may be in the range of picoseconds allowing much faster reconfiguration speeds for devices (such as ROADMs) made from embodiments of the disclosed ring resonator.

The ring resonators described here can be used to implement an optical add-drop multiplexer, which is a device used in DWDM systems for multiplexing and routing different wavelength channels of light into or out of an optical fiber. An optical add is an input, and an optical drop is an output. The small size of the ring resonator disclosed here allows construction of a scalable ROADM. A ROADM is a form of optical add-drop multiplexer that adds the ability to remotely switch traffic from a DWDM system at the wavelength layer. This allows light of individual wavelengths carrying data channels to be added and dropped from a transport fiber without the need to convert the signals on all of the DWDM channels to electronic signals and back again to optical signals. Large ROADMs or wavelength selective cross-connect arrays based on ceramic electro-optics devices are not scalable due the large array areas resulting for the large number of centimeters size devices required.

ROADM functionality originally appeared in long-haul DWDM equipment, but also appears in metro optical systems because of the need to build out major metropolitan networks to deal with the traffic driven by the increasing demand for packet-based services. A ROADM may be considered to be a specific type of optical cross-connect between an optical bus that functions as a high bandwidth trunkline, and a set of service add/drops that function to branch the optical bus signals to and from other locations. A traditional ROADM includes three stages: an optical demultiplexer that separates wavelengths for services drops, an optical multiplexer that joins wavelengths from different services add/drops, and between them a middle stage that reconfigures the paths between the optical demultiplexer, the optical multiplexer and a set of service drops for adding and dropping signals. The ROADM disclosed here performs all those functions in one device. Ultimately, the ROADMs can find uses for highly dense, rapidly configurable optical interconnects to exchange data between densely packed processors and memory where there is insufficient real estate to support highly parallel high speed interconnects on wafers without using DWDM multiplexing.

A multiplexer such as a ROADM may be characterized by the number of channels added together into a single bus. The case of four channels into one bus is designated by "4×1". Likewise, a demultiplexer may be characterized by the number of channels that a single bus can be split into. The case of one bus into four channels is designated by "1×4". A device that is both a multiplexer and a demultiplexer (e.g., a ROADM) may be characterized by both designations; such as for the case of one bus and four channels, the designation is "1×4×1".

FIG. 8 is a schematic top view that illustrates a scalable ROADM 800 that includes an optical bus 810, a plurality of ring resonator elements 802/804/806/808, optical service add/drops 812/814/816/818, and a controller 820. This non-limiting example represents a 1×4×1 ROADM; alternate embodiments may utilize any number of ring resonators and any number of optical input/output buses. Although not shown in FIG. 8, the ring resonator elements 802/804/806/808 and the optical source bus 810 are coated with a voltage-controlled organic electro-optic cladding of the type described above. The voltage-controlled organic electro-optic cladding has a tunable refractive index that is changed by controller 820 in a manner that impacts the wavelength selectivity of each ring resonator. The ROADM 800 utilizes ring resonator elements configured as described above to form a ROADM that may be efficiently scaled for manufacturing and implementation due to its implementation with organic electro-optic materials. The cladding increases the refractive index of ring resonator elements 802/804/806/808, by improving the connection of the electrodes and thus the efficiency of the biasing voltage, thereby allowing smaller size optical ring resonators. The smaller size (in contrast to existing ceramic and other designs) and the compatibility of the organic electro-optic material with silicon allow semiconductor manufacturing of the ROADM which can readily accommodate a large number of ring resonators. This allows the ROADM to be scaled to accommodate large numbers of optical ring resonators on a single semiconductor die.

We have also demonstrated to the ability to tune these rapidly tunable wavelength selective ring resonators over multiple wavelength bands. This could greatly increase the scalability of these ROADMS to support many wavelengths relative to ROADMs based on devices that can only add or drop a single wavelength band selectively.

Optical source bus 810 is coupled to the ring resonator elements 802/804/806/808 and is configured to simultaneously receive/send optical signals from/to the ring resonator elements 802/804/806/808 respectively. The optical source bus 810 is a transport waveguide (e.g., an optical fiber) containing a plurality of DWDM signals having different wavelengths. For example, a cable television trunkline could contain a variety of analog standard TV channel signals, digital standard TV channel signals, HDTV channel signals, a video on demand channel, and internet traffic. Another example might sensor data for a display in a tactical aircraft. A tactical aircraft control data bus is a type of optical node, which is generally used for the construction of a loop-based optical telecommunications network.

In this embodiment, each ring resonator element has a corresponding add/drop waveguide that is used to couple optical signals to and from the ring waveguide. Optical add/drop waveguides 812/814/816/818 are coupled to their respective ring resonator, and the add/drop waveguides are configured to simultaneously receive/send optical signals from an external source from/to the ring resonator elements 802/804/806/808. The optical add/drop waveguides 812/814/816/818 may serve as input/add or output/drop ports as needed. For example, optical add/drop waveguides 812/814/816/818 might represent cable television service drops to four households. Another example might be a control linkage in a tactical aircraft. As explained above, "add" and "drop" refer to the capability of the scalable ROADM to add one or more new wavelength channels to an existing multi-wavelength WDM signal, and/or to drop (remove) one or more channels, routing those signals to another network path such as one of the optical add/drop waveguides 812/814/816/818.

Ring resonator elements 802/804/806/808 direct incoming add signals from the respective add/drop waveguide to the optical source bus 810 and direct outgoing drop signals from the optical source bus 810 to the respective add/drop waveguide. Ring resonator elements 802/804/806/808 function as optical multiplexers that add signals (having specific wavelengths) from the optical add/drop waveguides 812/814/816/818 to the optical source bus 810. Simultaneously, ring resonator elements 802/804/806/808 function as demultiplexers that drop signals (having specific wavelengths) from optical source bus 810 to the optical add/drop waveguides 812/814/816/818. The optical source bus 810 is routed to all four of the ring resonator elements. Each ring resonator element has an add/drop waveguide, and each of the ring resonator elements is individually controlled by the controller. The controller can adjust each ring individually, resulting in four different wavelengths being dropped from the common bus.

The controller 820 regulates the wavelength selectivity of the ring resonator elements 802/804/806/808. The controller 820 functions to reconfigure the ring resonator elements by changing the bias/tuning voltage as a function of wavelengths $V(\lambda_1)/V(\lambda_2)/V(\lambda_3)/V(\lambda_4)$ ($\lambda_1$-$\lambda_4$) may also represent sub bands 1-4 including more than one wavelength) on each of the ring resonator electrodes respectively (see 320 and 318 in FIG. 6), which in turn alters the refractive index of the organic electro-optic cladding material near the respective electrodes. The main advantages of such reconfiguration are: 1) the planning of an entire bandwidth assignment need not be carried out during initial deployment of a system; 2) the configuration can be performed when required and as needed; and 3) voltage-controlled wavelength selectivity allows for remote configuration and reconfiguration.

Relative to prior solutions, the device disclosed here: (1) switches more rapidly; (2) can switch over more than a FWHM, potentially greatly reducing the number of devices required to design and operate an N×M wavelength selective switch array with a large number of fibers=N, and wavelengths=M; (3) are readily compatible with silicon processing; (4) scale readily to compact ROADMs and wavelength selective cross-connect arrays with a large number of fibers=N, and wavelengths=M; (5) are not limited to configurable DWDM circuits, and can be considered for wavelength based optical burst and packet switches; (6) can be readily extended over a 20 nm free spectral range required for wavelength switching across the C-band; and (7) can operate at practical voltages since electro-optic coefficients are at least ten times greater than the state of the art ceramic electro-optic materials, a hundred times greater than strained layer silicon electro-optic materials, and can have electrode gaps at least ten times smaller than non-silicon devices.

Figure 9:
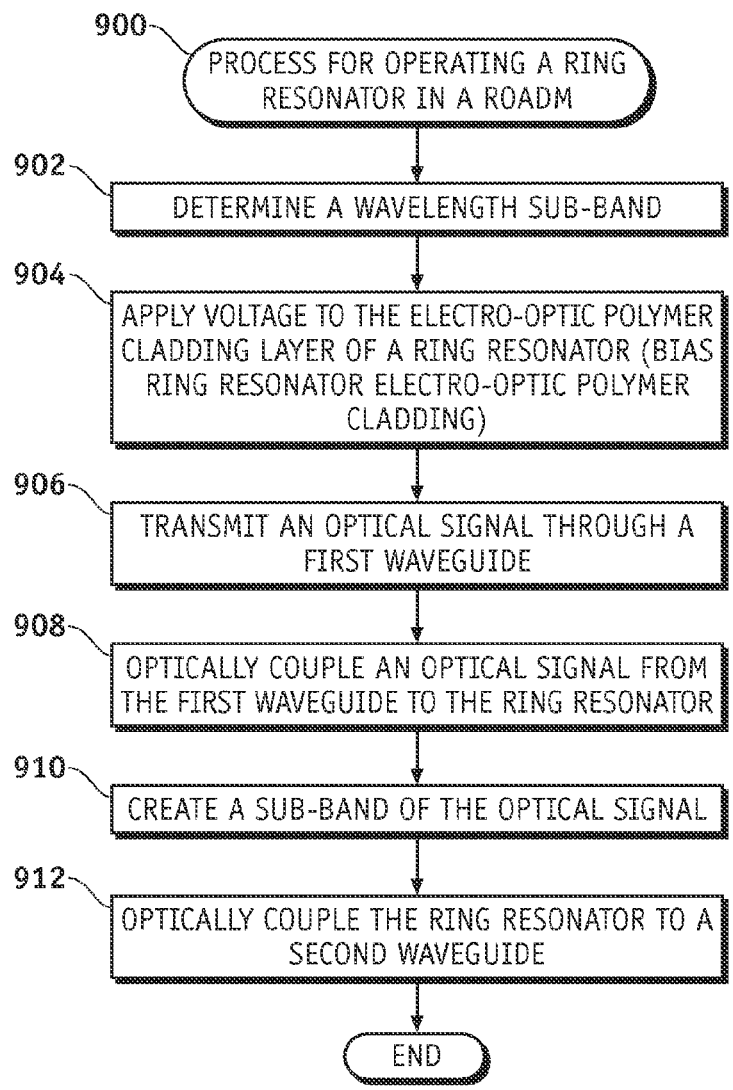
FIG. 9 is a flow chart illustrating a process for operating a rapidly tunable wavelength selective ring resonator.

FIG. 9 is a flowchart illustrating a process 900 for operating a rapidly tunable wavelength selective ring resonator in a ROADM. The various tasks performed in connection with process 900 may be performed by software, hardware, firmware, or any combination thereof. For illustrative purposes, the following description of process 900 may refer to elements mentioned above in connection with FIGS. 3-8. In practical embodiments, portions of process 900 may be performed by different elements of a device or system for wavelength selection, e.g., the ring resonator, the wavelength selection device, the electro-optic material, the electrodes, and the controller. Process 900 is described in terms of one of the example embodiments described herein, namely, a rapidly tunable wavelength selective ring resonator.

Process 900 selects wavelengths that are available in a waveguide, and biases an electro-optic material to restrict transmission to wavelengths based on control electrodes. Process 900 may begin by determining a wavelength from the plurality of wavelengths that are available for selection by a ring resonator waveguide (task 902). For example, the plurality of wavelengths could be available in a full spectrum standard single mode fiber, namely about 1260 nanometer to about 1625 nanometer. A selected wavelength of the plurality of wavelengths separated by the free spectral range of the resonator may be about 1550 nanometer to about 1625 nanometer. Selecting the wavelength band may be chosen to not conflict with other optical signals currently in the optical bus. Selecting the wavelength band may also be chosen to not conflict with other optical signals currently in the first waveguide or signals currently in the second waveguide. The selection may be made algorithmically by a controller, by an outside signal, by a router, or the like. Process 900 then applies a voltage to the ring resonator to tune the ring resonator to a desired wavelength (task 904). In practice, task 904 applies voltage to the organic electro-optic cladding layer for each ring resonator.

In connection with task 904, process 900 biases the organic electro-optic cladding as needed for each ring resonator waveguide to restrict transmission through the ring resonator waveguides to the respective wavelength band of the plurality of wavelengths. As described in FIG. 3 above, the organic electro-optic cladding layer allows transmission only to wavelengths set according to a bias voltage as directed by the controller. The biasing may be chosen to create a wavelength band that does not conflict with other optical signals currently in the optical bus. The biasing may also be chosen to create a wavelength band that does not conflict with other optical signals currently in the first waveguide or signals currently in the second waveguide. For illustration without limitation, the organic electro-optic cladding might be set to limit the allowed transmission to wavelengths from about 1550 nanometer to about 1625 nanometer when biased to about 2.5 volts. Because of the high electronic polarizability of the organic electro-optic cladding layer, the biasing may change the set of selected wavelengths at a speed limited only by the cladding layer. For example, a wavelength resonance shift per volt of several GHz/volt is possible with a sub microsecond (or sub picosecond) rise and fall time. It is not limited by the tens of femtosecond response times of the electro-optic material, but rather is only limited by Q for the response time of the ring resonator.

Process 900 may then transmit an optical signal through a first waveguide (task 906). Process 900 may then optically couple the optical signal to the ring resonator waveguide (task 908). While the entire optical signal is coupled to the ring resonator waveguide, only those signals whose wavelengths are able to resonate will resonate in the ring resonator, and those wavelengths that do not resonate will be attenuated. Process 900 may then use the ring resonator to create a wavelength band of the optical signal (task 910). As explained above in the context of the electric field modulation areas, if a wavelength band of the optical signal is within the pass band induced in the waveguide by the organic electro-optic cladding, then the wavelength band of the optical signal is allowed to resonate in the ring resonator, otherwise the other waveguide components of the optical signal are blocked. This is a form of optical filtering. Process 900 may then optically couple the ring resonator to a second waveguide (task 912). The optical signal through the second waveguide will be an optically filtered wavelength band of the optical signal from the first waveguide.

The present subject matter provides a key wavelength selective filter device for implementing rapidly configurable DWDM networks. In addition, the ability to produce these devices via standard silicon design and fabrication processes provides a viable path for dramatically reducing the size, weight, and power. These advantages are critical features for employing rapidly configurable DWDM networks on mobile platforms, opening the opportunity to gain the benefits of rapidly configurable, mixed signal networking on size, weight, and power limited platforms. These benefits include achieving dramatically enhanced system reliability/availability based on the ability to integrate active monitoring detection and electronic feedback onto a common substrate. Moreover, these devices are not limited in speed by the tens of femtosecond response times of the electro-optic materials, but only the optical Q's of the resonators themselves and the RC time constants for the electrical contacts, where lower Q, multipole, multiring resonators give the highest spectral efficiencies and fastest tuning speeds. The disclosed devices, systems and methods could be used with DWDM hardware or semiconductor based waveguide optics to implement reconfigurable terrestrial and aerospace optical networks.

While at least one example embodiment has been presented in the foregoing detailed description, it should be appreciated that a vast number of variations exist. It should also be appreciated that the example embodiment or embodiments described herein are not intended to limit the scope, applicability, or configuration of subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A voltage-tunable wavelength selective ring resonator comprising:
    a ring-shaped waveguide formed on a semiconductor substrate, the ring-shaped waveguide being configured to propagate optical signals having predetermined resonant wavelengths;
    an organic electro-optic cladding layer formed over the ring-shaped waveguide, the electro-optic cladding layer having a voltage-controlled variable refractive index and comprising an organic electro-optic material of YL124 and electro-optic dendrimer PSLD41; and
    voltage applying means for applying a voltage across the electro-optic cladding layer, the means for applying being configured to apply a wavelength-specific control voltage to the electro-optic cladding layer, the wavelength-specific control voltage corresponding to the predetermined resonant wavelengths for the ring-shaped waveguide.

2. The ring resonator according to claim 1, wherein the ring-shaped waveguide is formed as an optical silicon ridge waveguide structure on the semiconductor substrate.

3. The ring resonator according to claim 1, wherein the ring-shaped waveguide is formed as an optical slotted waveguide structure on the semiconductor substrate.

4. The ring resonator according to claim 1, wherein the means for applying the voltage across the electro-optic cladding layer comprises an electrode control structure coupled to the electro-optic cladding layer.

5. The ring resonator according to claim 1, wherein the electro-optic cladding layer comprises an unoriented organic electro-optic material comprising about 25 percent YL124 and 75 percent electro-optic dendrimer PSLD41 dissolved in trichloroethane to form a solution of about 10 percent solids weight.

6. The ring resonator according to claim 1, further comprising a voltage controller coupled to the means for applying the voltage, the voltage controller being configured to generate tuning voltages for the electro-optic cladding layer.

7. A ring resonator wavelength selector system comprising:
    an optical ring resonator waveguide configured to propagate optical signals having desired resonant wavelengths according to a refractive index of an organic electro-optic cladding layer on the optical ring resonator waveguide surface, the organic electro-optic cladding layer including an organic electro-optic material of YL124 and electro-optic dendrimer PSLD41, the cladding formed over the optical ring resonator waveguide, the electro-optic cladding layer having a voltage-controlled variable refractive index, wherein the voltage-controlled variable refractive index influences the desired resonant wavelengths propagated by the optical ring resonator waveguide; and
    a plurality of electrodes coupled to the electro-optic cladding layer and configured to provide a control voltage to the electro-optic cladding layer.

8. The system according to claim 7, wherein at least one of the plurality of electrodes includes metal.

9. The system according to claim 7, wherein at least one of the plurality of electrodes includes doped silicon.

10. The system according to claim 9, wherein at least two of the plurality of electrodes are arranged in a periodic electrode structure.

11. The system according to claim 7, further comprising a voltage controller coupled to the plurality of electrodes, and configured to generate tuning voltages for the organic electro-optic cladding layer, wherein the tuning voltages change the voltage-controlled variable refractive index of the electro-optic cladding layer to tune wavelength selectivity of the optical ring resonator waveguide for optical signals of specific wavelengths in the optical ring resonator waveguide.

12. The system according to claim 7, wherein at least one of the plurality of electrodes has a serrated shape.

13. The system according to claim 7, further comprising:
a first electrode surrounded by the optical ring resonator waveguide; and
a second electrode positioned outside a perimeter of the optical ring resonator waveguide such that a voltage potential is created across the electro-optic cladding layer located between the first electrode and the second electrode.

* * * * *